(12) United States Patent
Pedersen

(10) Patent No.: US 11,286,710 B2
(45) Date of Patent: Mar. 29, 2022

(54) GLAZING SUPPORT SYSTEM

(71) Applicant: VÅGÅ TEKNIKK AS, Vågå (NO)

(72) Inventor: Roald H. Pedersen, Kongsberg (NO)

(73) Assignee: VÅGÅ TEKNIKK AS, Vågå (NO)

( * ) Notice: Subject to any disclaimer, the term of this patent is extended or adjusted under 35 U.S.C. 154(b) by 0 days.

(21) Appl. No.: 17/055,466

(22) PCT Filed: May 15, 2019

(86) PCT No.: PCT/EP2019/062524
§ 371 (c)(1),
(2) Date: Nov. 13, 2020

(87) PCT Pub. No.: WO2019/219767
PCT Pub. Date: Nov. 21, 2019

(65) Prior Publication Data
US 2021/0198938 A1 Jul. 1, 2021

(30) Foreign Application Priority Data
May 17, 2018 (GB) .................................... 1808022

(51) Int. Cl.
*E06B 3/58* (2006.01)
*E06B 3/96* (2006.01)
(Continued)

(52) U.S. Cl.
CPC .......... *E06B 3/5864* (2013.01); *E06B 3/5409* (2013.01); *E06B 3/5885* (2013.01); *E06B 3/9649* (2013.01)

(58) Field of Classification Search
CPC ........ E06B 3/58; E06B 3/5864; E06B 3/5885; E06B 3/9649
See application file for complete search history.

(56) References Cited

U.S. PATENT DOCUMENTS 4,031,665 A * 6/1977 Abramson ................ E06B 3/12
49/501
7,752,809 B2 * 7/2010 Di Vinadio ............. E05C 9/006
49/192
(Continued)

FOREIGN PATENT DOCUMENTS

CH 442691 A * 8/1967 ........... E06B 3/9649
DE 7000649 U 10/1970
(Continued)

OTHER PUBLICATIONS

Notification of Transmittal of the International Search Report and the Written Opinion (Form PCT/ISA/220), International Search Report (Form PCT/ISA/210), and Written Opinion (Form PCT/ISA/237) for International Application No. PCT/EP2019/062524 dated Jul. 23, 2019, 24 pages.

(Continued)

*Primary Examiner* — Ryan D Kwiecinski
(74) *Attorney, Agent, or Firm* — Withrow & Terranova, P.L.L.C; Vincent K. Gustafson

(57) ABSTRACT

A glazing assembly comprises a glazing support system for attaching a glazing unit to a frame element. The glazing support system comprises: a tension member for extending around a major portion of the periphery of the glazing unit 4; and a connection system for coupling the tension member to the frame element in at least two locations and for transferring tension forces from the tension member to the frame element whilst compression forces arising due to tension in the tension member are applied to the outside of the glazing unit.

27 Claims, 25 Drawing Sheets

(51) Int. Cl.
*E06B 3/54* (2006.01)
*E06B 3/964* (2006.01)

(56) References Cited

U.S. PATENT DOCUMENTS

| | | | |
|---|---|---|---|
| 9,217,278 B2 * | 12/2015 | Riley | ................... E06B 3/9645 |
| 2004/0111974 A1 * | 6/2004 | Boroviak | ............. E06B 3/9649 |
| | | | 49/501 |

FOREIGN PATENT DOCUMENTS

| | | | | |
|---|---|---|---|---|
| DE | 2630312 A | | 1/1978 | |
| FR | 2039462 A5 * | | 1/1971 | ............... E06B 3/12 |
| FR | 2529626 A1 * | | 1/1984 | ........... E06B 3/9649 |
| FR | 2538843 A1 * | | 7/1984 | ............... E06B 1/24 |
| JP | 2003011662 A | | 1/2003 | |
| JP | 2006104759 A | * | 4/2006 | |
| JP | 2006104759 A | | 4/2006 | |
| JP | 2013108282 A | | 6/2013 | |
| WO | 9308360 A | | 4/1993 | |
| WO | WO-9308360 A1 * | | 4/1993 | ........... E06B 3/9649 |
| WO | 2007102177 A1 | | 9/2007 | |
| WO | WO-2007102177 A1 * | | 9/2007 | ........... E06B 3/9649 |

OTHER PUBLICATIONS

Search Report under Section 17(5) for United Kingdom Patent Application No. GB1808022.6 dated Jul. 10, 2018, 3 pages.

* cited by examiner

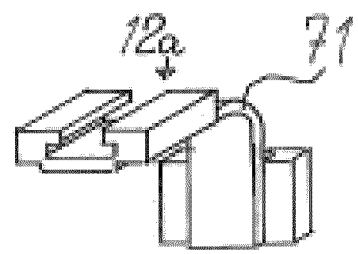
Figure 15b
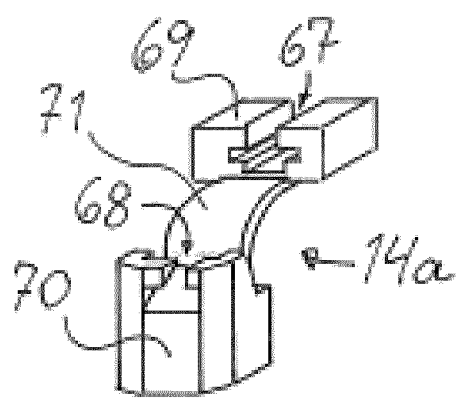
Figure 15a
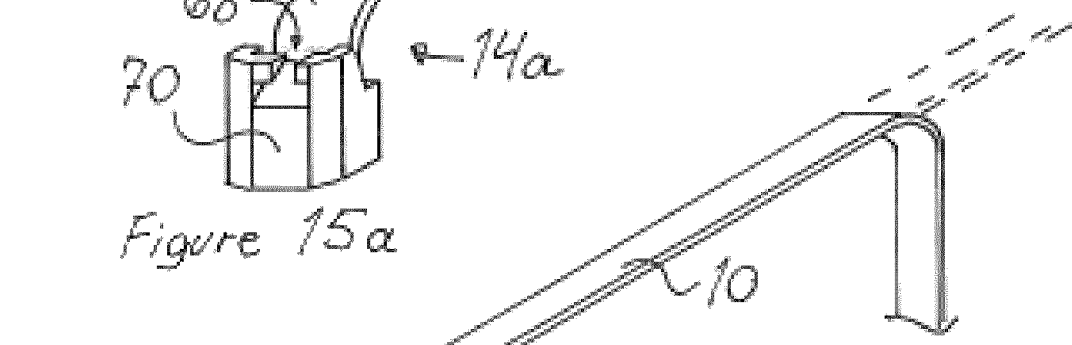
Figure 15c
Figure 15d
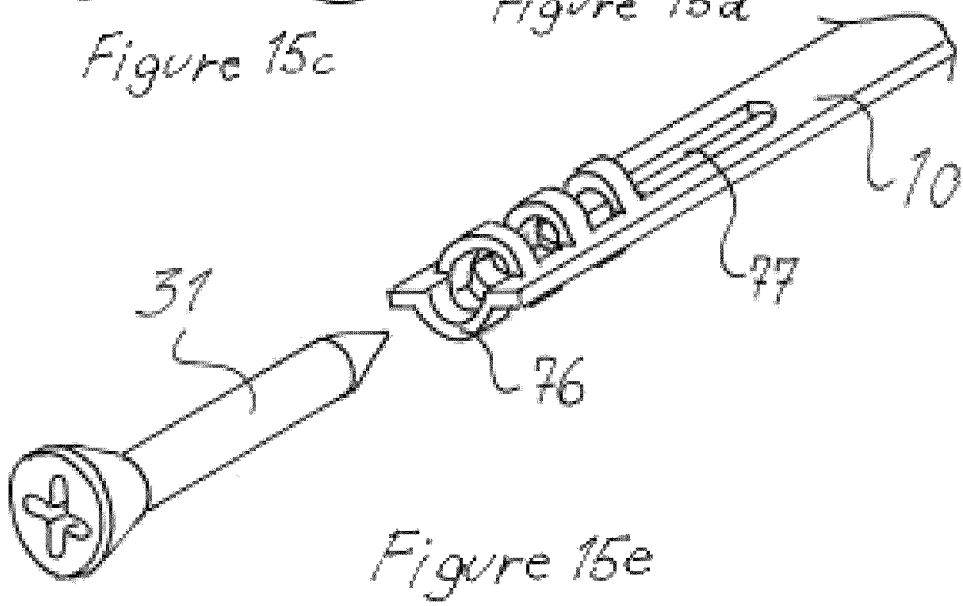
Figure 15e

GLAZING SUPPORT SYSTEM

This application is a 35 U.S.C. § 371 national phase filing of International Application No. PCT/EP2019/062524 filed on May 15, 2019, and claims the benefit of United Kingdom Patent Application No. 1808022.6 filed on May 17, 2018, wherein the disclosures of the foregoing applications are hereby incorporated by reference herein in their respective entireties.

The invention relates to a glazing support system for attaching a glazing unit to a frame element, such as for attaching multi-layer glazing to a frame element of a window frame or door frame.

It is known to have glazing units provided separately to the frame of a window or door. In modern times most glazing has multiple layers and hence the glazing units consist of at least two layers of glass, with a vacuum or other sealed atmosphere in between them, and with some structure around the periphery of the glazing unit to give a spacing between the layers as well as to form a seal. This type of a glazing unit can be used with frames of differing constructions, such as in wooden, aluminium or plastic frames. Typically the glazing unity is placed into an opening in the frame and then secured by mechanical means, such as by supporting the weight of the glazing unit on suitable spacer blocks (or directly on the frame) as well as by holding the glazing unit between other elements of the frame. In modern window frames the glazing unit may be held by compression between interior and exterior parts of the frame, often with rubber seals for weather proofing. In more traditional designs the glazing unit can be secured by the use of putty to retain the glazing unit within the frame.

The performance and energy efficiency of glazing units is constantly increasing and it is therefore important for glazing support systems to have corresponding performance in terms of heat transfer and retention. Thus, the glazing support system should not result in degraded energy efficiency for a window or door and ideally should have minimal impact on the overall energy efficiency compared to the performance of the glazing unit. As well as this there is also a generally increased desire for glazing of larger areas, which results in a need for frames that are small, or "low profile" in relation to the glazing. Further constraints arise due to the fact that modern glazing units are relatively heavy, which means that effective glazing support systems should be both strong, to bear the weight of the glass, but also lightweight, so that the end product can be easily moved, for example in the case of opening windows and for doors. When glazing units are used in structural panels in large glazed walls then there are added restrictions on weight to minimise the combined structural load of the walls.

Viewed from a first aspect, the invention provides a glazing assembly comprising: a glazing support system, a glazing unit and a frame element, wherein the glazing support system is for attaching the glazing unit to the frame element, the glazing support system comprising: a tension member for extending around a major portion of the periphery of a glazing unit; and a connection system for coupling the tension member to the frame element in at least two locations and for transferring tension forces from the tension member to the frame element whilst compression forces arising due to tension in the tension member are applied to the outside of the glazing unit.

With this arrangement the frame element and the glazing unit can structurally interact in a new way and the glass can provide a greater contribution to the stiffness and strength of the combined glazing unit and frame element. Thus, the glazing unit may effectively support the frame rather than vice versa as with conventional frame designs. The overall size of the glazing support system can be reduced which means that the cross-section of the associated frame is also reduced. This has great benefits in relation to energy efficiency of products such as windows and doors since the glazing unit may take up a larger proportion of the area of the window or door, with the frame needing less space. Thus, a greater area of glazing can be provided for a given opening within a wall, and the heat transferred into or out of a building via the frame is reduced. Typically walls are more insulating than the glazed unit, and the glazed unit is more insulating than its frame. Some prior art plastic frames can have good performance in terms of insulation, but large cross-sections are needed to bear the weight of the glazed unit and hence the glazed area is greatly reduced for a given opening in the wall. With the proposed glazing support structure the negative impact on energy efficiency of a building that is associated with a window or a glazed door is minimised, since the glazed area can be maximised. Stated another way, it is possible to meet a given requirement for glazed area (e.g. based on considerations of light or ventilation) with a reduced size of opening within the wall. Buildings using the proposed glazing support system can hence be designed to be more energy efficient than building using traditional window and door frames. Existing buildings can be retrofitted with new glazing units of a larger size without changing the size of the openings within the walls of the building. A reduced size for the support system also gives other advantages compared to windows with large frame sections, such as increased sound insulation and greater fire resistance.

The tension member encircles a major part of the glazing unit and tension within the tension member can hold it tightly around that part of the glazing unit via forces applied to the outside of the glazing unit. In some examples the tension member may extend around at least three sides of a four-sided glazing unit. By having the tension member extend around most of the glazing unit then the frame element that holds the main loads from the tension member can be at just one side of the glazing unit. The connection to the frame element via the connection system transfers tension forces from the tension member to the frame element, which can be contrasted with the prior art use of compression forces and/or forces from the weight of the glazing only at the base of the frame. This means that the glazing unit can be attached to a frame element that is above, below or at the side of the glazing unit, with a more flexible configuration than some prior art systems. The weight of the glazing unit may be taken up primarily by a frame element on just one side of the glazing unit, which allows for much lower profile frames and even "frameless" designs as discussed below.

The tension member may be arranged to bear on one or more corners of the glazing unit and to thereby apply a compression force to the glazing unit. Thus, the tension member may wrap around the one or more corners with the tension forces in the tension member resulting in compression forces at the corner(s). This may be done by allowing the tension member to bear directly on the sealing spacer between layers of the glazing unit. Alternatively, the glazing support system may include corner blocks for placement on corners of the glazing unit to aid in effective transfer of such compression forces. The corner blocks may also serve to protect the corners of the glazing unit. In some examples the corner blocks are arranged to deform in order to distribute forces evenly between the tension member and the glazing unit. It is known for glazing units to be produced to tolerances that allow for differing layers to extend by slightly differing amounts at the edges and corners of the glazing unit. By using a deformable corner block then the risk of excessive stresses is reduced and the compression forces can be distributed more evenly over different layers of a multi-layer glazing unit. The corner block may be configured to transfer load to glazing layers of the glazing unit as well as to the separating structure between the glazing layers. This may advantageously be done with a pre-determined ratio of compressive force transfer to the different parts of the glazing unit.

The corner blocks may include a load bearing section for placement across the width of the glazing unit around a corner thereof and in between the glazing unit and the tension member. In addition, the corner blocks may include flanges forming sidewalls extending from outer parts of the load bearing section toward and/or away from the glazing unit. Inner flanges extending toward the glazing unit can form sidewalls of an inside channel of the corner block for ensuring that the corner block is securely seated on the glazing unit, with the edge of the glazing unit being placed within the inside channel, and the inside channel fitting around a corner of the glazing unit. As well as this or alternatively, outer flanges extending away from the glazing unit can form sidewalls of an outside channel for ensuring that the tension member is securely seated on the corner block. There may be multiple channels on the outside of the corner block in the case where multiple tension members are used as discussed below. In some examples, the inner flanges are omitted at the vertex of the corner block (i.e. at the part of the corner block that first over the vertex of the corner of the glazing unit) in order to ensure that the added stiffness from the inner flanges does not restrict deformation of the corner blocks during distribution of forces as discussed above. The outer flanges could also optionally be modified or omitted at the vertex.

The tension member and the corner blocks may be arranged such that a corner block is compressed between the frame element and the glazing unit. This can aid in transfer of forces. Alternatively or additionally, the tension member and the corner blocks may be arranged so that forces transferred to the frame element via friction. The corner blocks may have a curved and/or smooth outer surface at the vertex so that the tension member can slide over the corner. In some examples, corner blocks intended for contact with the frame element may have a profiled surface such as a serrated surface in order that they can engage with and/or embed into the frame element.

It is a significant feature of the invention that the glazing support system includes a tension member for extending around a major part of the glazing unit. This tension member may take various forms, for example it may be a flexible elongate element such as a cable, cord, strap, or belt comprising any suitable material. It may comprise several linked parts, including multiple rods linked together. The glazing support system may use multiple tension members, such as two tension members placed in a parallel arrangement around the glazing unit.

Example embodiments use a strap as the tension member, and this strap may take the form of a band of material with a "flat" cross-section, i.e. a width that is greater than the thickness of the band, typically several times greater. A band has advantages over other forms such as a cable (which may have a circular cross-section) since a flat cross-section can carry increased tensile forces for a given thickness extending from the glazing unit, and hence it allows for lower profile designs for the glazing support system.

The primary function of the tension member is to carry a tensile load, and hence the material used is selected with that in mind. Suitable materials include fibre reinforced composites, plastics or metals including steels. It can be an advantage for the band to be able to deform elastically at the level of forces applied to attach the glazing unit using the tension member. In some examples the material is selected in order that it has a coefficient of thermal expansion similar to that of glass, and so that during temperature changes there is no significant increase or decrease in the forces from the interaction of the glazing unit and the tension member. Steel can provide an appropriate match with the coefficient of thermal expansion of glass. Thus, a steel tension member may be used, such as a steel band.

The glazing support system may include a tensioning mechanism for tightening (or loosening) the tension member around the glazing unit. There may be a tensioning mechanism at one or both ends of the tension member, additionally or alternatively a tensioning mechanism may be provided part-way along the length of the tension member. In some cases the tension member may extend fully around the glazing unit, wherein the ends may be joined to form a loop, and wherein the tensioning mechanism may be on the tension member at any point in order to tighten the loop. In the case of a tension member extending fully around the glazing unit then the tension forces transferred to the frame element may be a tension arising from "hanging" the glazing unit off the frame element, and/or a tension applied as "bow tension" via bridge connectors such as those discussed below. The tensioning mechanism(s) may be attached to the frame element, especially in the case where an end of the tension member is attached to the tensioning element. The tensioning mechanism may include a threaded system using a bolt or a "jubilee clip" type arrangement for adjusting the tension of the tension member via action of a screw thread. A wedge locking system may alternatively be used to hold the tension member with a tensile force applied.

The glazing support system may include the frame element as an integer thereof. Thus, the glazing support system may include a combination of the tension member, the connection system and the frame element. The connection system may be integrated with the frame element or securely fixed thereto. The connection system may include holes passing through the frame element allowing for the tension member to be threaded through and/or around one or more part(s) of the frame element. The connection system may include one or more connector(s) for attachment to the tension member. In some cases the connectors may be formed by a combination of parts of the frame element and parts attached to the tension member, such as a hook and eye arrangement. As will be appreciated from the discussion below the connectors may take different forms and the glazing support system may include multiple different types of connectors. The frame element may include hinges allowing for the glazing unit to be moved between open and closed positions, e.g. for a door or an openable window, and the hinges may be joined to connectors for coupling to the tension member. The frame element can be made of multiple pieces each connected to the tension member, and/or it may join together with further frame elements each connected to the tension member, wherein the multiple frame elements together form parts of a frame for the glazing unit.

The connector(s) may include an anchor block arranged to hold an end of the tension member to the frame element. In some cases there may be two anchor blocks with one at each end of the tension member and each end of the tension member hence being attached to the frame element. One of the two anchor blocks may be arranged so that the tension member attaches to the frame element at an angle to a longitudinal axis of the frame element. For example, the frame element may be an elongate member aligned with one side of the glazing unit, and the anchor block may be arranged so that the tension member joins to the frame element in a diagonal direction compared to the length of the frame element and the side of the glazing unit, such as at an angle of between 30 and 60 degrees. The anchor block may include a tensioning mechanism in order that the tension member can be tightened at the point where the end is connected to the frame element. In some cases the anchor block(s) is/are integrated into hinges of the frame element.

One specific example includes a first tensioning mechanism as a part of a first anchor block at a first end of a frame element, the first tensioning mechanism arranged to be adjacent a first corner at one end of a first side of a four-sided glazing unit, with the frame element placed along the first side of the glazing unit, and a second tensioning mechanism as a part of a second anchor block at a second end of the frame element with the second tensioning mechanism arranged to be adjacent a second corner at the other end of the first side. In that case the tension member may extend from the first corner, away from the frame element and the first side of the glazing unit, around the other three sides of the glazing unit and around the other two corners thereof before returning to the second end of the frame element at the second corner of the glazing unit.

In addition to, or as an alternative to, the use of anchor blocks the connector(s) may include one or more bridge connector(s) for holding the tension member at one or more points along the length of the tension member and for transferring tension forces to the frame element at points away from the ends of the tension member. In some examples the bridge connectors take the form of openings on the frame element, such as loops provided on the frame element, with the tension member threaded through the openings. In the case of a strap-like tension member the openings may be similar to loops for holding a belt on trousers. With the use of bridge connectors the frame element is pulled toward the glazing unit and the two are held securely relative to one another by tension, which is primarily in the tension member and compression, which may be primarily in the glazing unit. Thus, the glazing support system may form a type of tensegrity structure.

It may be beneficial to combine the bridge connectors along with forces transferred at the corners of the glazing unit as discussed above. In some examples the frame element may include a bracket configured for placement at a corner of the glazing unit, the bracket including bridge connectors adjacent the sides of the glazing unit spaced apart from the corner. In that case the tension member may extend along one side of the glazing unit via a first bridge connector; then around the corner of the glazing unit, applying a compression force to the corner; then through a second bridge connector toward a further corner of the glazing unit. In this way the tension member can apply tension forces at the two bridge connectors, with an intervening compression force at the corner, and the bracket will be held adjacent the corner without coming into direct contact with the glazing unit. In effect, the glazing unit supports the bracket, rather than the other way around as is often the case with conventional frame elements. The glazing support system may include multiple brackets, such as one bracket for each corner of the glazing unit. In the case of a hinged frame element then the hinges may be incorporated with brackets at two adjacent corners. The brackets may also hold anchor blocks and/or tensioning mechanisms.

There may be at least one connector on each side of the glazing unit where a part of the frame element is present. It will however be appreciated that it is not essential for a part of the frame element to be present on all sides of the glazing unit. Instead, the tension member can extend along one or more of the sides of the glazing unit without any connector(s) being present along those sides, and without any part of the frame element being present along those sides. That would be the case in some "frameless" arrangements, where the proposed glazing support system would allow for a frame element on only one side of the glazing unit, with the other sides being encircled by the tension member absent any frame elements. It will be appreciated that this allows for the "frame" around those sides to consist primarily of the tension member, perhaps with an appropriate decorative or protective covering, and this allows for a minimal thickness around the glazing unit.

The glazing unit may be any type of glazing unit including double glazing, triple glazing and so on. The proposed glazing support system may be used with any glazing unit, although in the example embodiments it is designed primarily for use with glazing units in the form or flat panels, such as rectangular glazing units as known for windows and doors. If it is required to use multiple glazing units within a single product, such as a window or door with multiple separate glazed panels, then this may be done using either a single common tension member, or multiple sets of tension members and connectors, along with either multiple frame elements or a single common frame element. The frame element may form a frame for the glazing unit by itself or when combined with other parts, such as decorative or protective coverings or cladding, sealing strips and so on.

In particular examples a glazed building panel, a door or a window may have the glazing support system of the first aspect, optionally including other features as described above.

It will be appreciated that the glazing assembly of the first aspect may be provided in kit form with the glazing support system being ready for assembly with the glazing unit and the frame element. Thus, in a second aspect the invention provides a kit for attaching a glazing unit to a frame element to form the glazing assembly, the kit comprising a tension member and a plurality of connectors as described above in connection with the first aspect. The kit may have further features and parts as set out above, such as one or more corner block(s), tensioning mechanism(s), anchor block(s), bridge connector(s) and/or bracket(s). The kit may include the frame element. The kit may be supplied along with the glazing unit.

Viewed from a third aspect, the invention includes a method for supporting a glazing unit using a glazing support system in a glazing assembly as discussed above, i.e. as in the first aspect and optionally including other features as set out above, the method comprising: locating the glazing unit and frame element adjacent one another; placing the tension member around the at least a part of the periphery of the glazing unit; and attaching the plurality of connectors to the tension member for transferring tension forces from the tension member to the frame element. The method may additionally include tightening the tension member, such as via one or more tensioning mechanisms. The tension member may be threaded through connectors such as the bridge connectors mentioned above.

Certain preferred embodiments of the invention will now be described by way of example only and with reference to the accompanying drawings in which:

FIG. 4b shows a close up of a corner of the arrangement of FIG. 4a;

FIGS. 4c and 4d are cross-sections through parts of the arrangement of FIG. 4a;

FIGS. 15a to 15d show details of brackets and anchorages for the glazing support system shown in FIG. 14;

FIG. 15e illustrates a solution for tensioning the strap by using a screw that engages the strap directly.

Figure 1A:
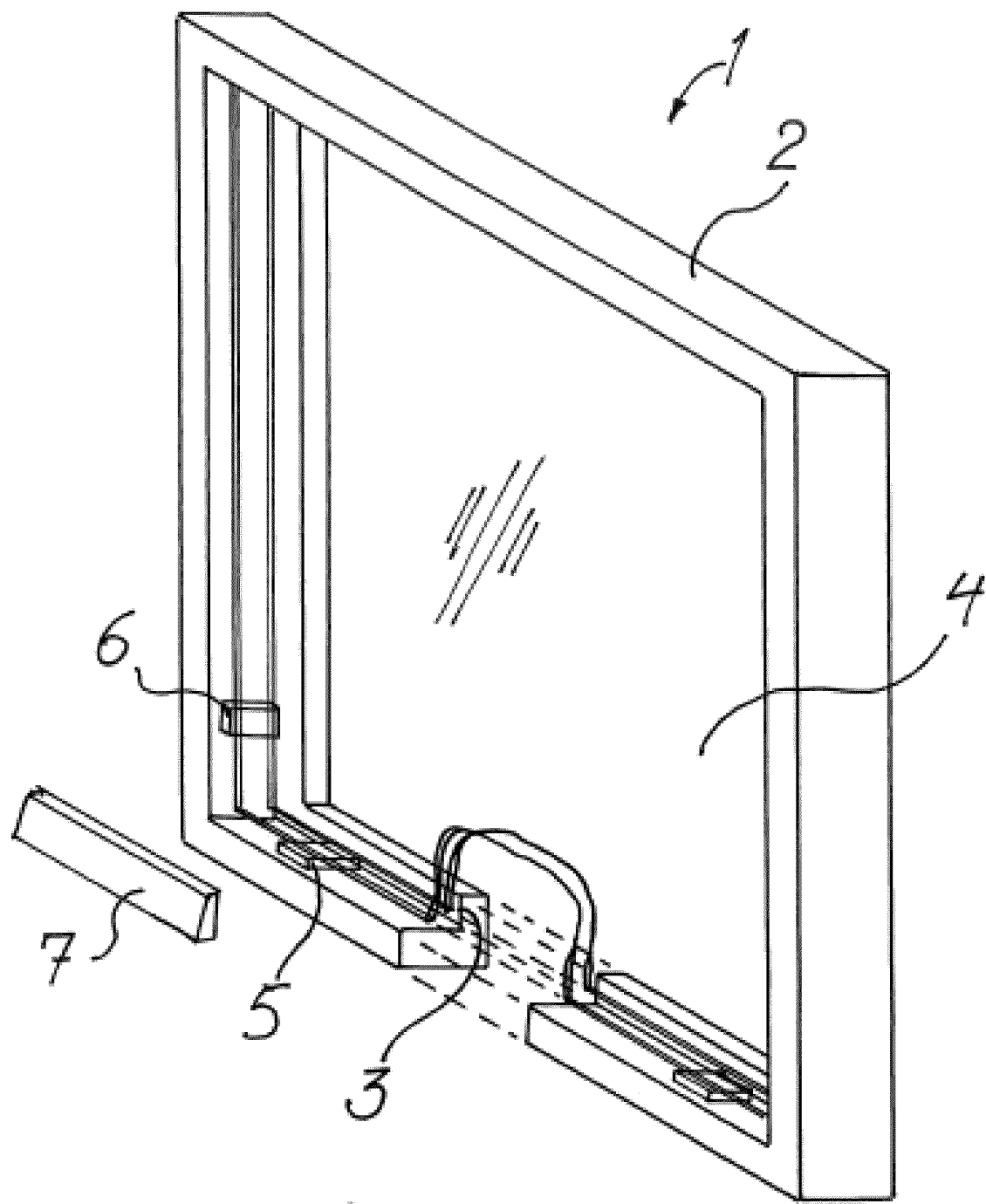
FIGS. 1a and 1b show a typical prior art arrangement for fixed and opening windows.

By way of example a glazing support system is described below in context of glazed windows as well as doors that are glazed. The glazing support system enables such windows and doors to be made with slimmer frames around the glass. This applies particularly to such items with heavy multi-glazed assembles—glass units—, with two or three or more layers of glass. For a given window or door, the height and the width of the glass may be increased. This gives better vision through the glass, more light is let in, and the heat transfer through the window or door is reduced. Sound insulation as well as resistance to fire is also improved with this design.

For the sake of simplicity, the term "window frame" is here used for the frame holding the glass of both a fixed window, as well as the frame holding the glass of a window that may be opened. It will be clear from the text which window that is referred to. It will also be clear from the text which parts of the window frame which is referred to, at any time. From here on we refer to "windows" in the description. However it will be understood that doors could be constructed in a broadly similar fashion, and that the glazing support system could also be used for other glazed constructions, such as skylights, roofing, glazed walls and so on.

It is known that in the major industrial countries in the world, there has been, and is, a strong trend towards more energy efficient windows. As mentioned above, one driving force for this is reducing heat transfer through the window. This again has the effect of reducing the heat loss through the window in cold weather, and of reducing the heat that is radiating in through the window in warm weather. The trend is driven by popular demand, as well as by official regulations for buildings, having criteria for allowable heat transfer through windows. Yet another driving force is sound insulation.

This has led to multi-glazed windows containing two, three or more glasses. With more glasses, the weight of the glass increases. This has again necessitated stronger window frames in order to carry the glazing units. In order to be stronger and stiffer, the cross sections of the frame members have increased compared to the frames typically used for single-glazed windows. This has a negative impact on several of the functions of the window. An advantage of the glazing support system discussed below is to enable thinner window frames, thereby avoiding the negative effects of thick window frames.

Windows that may be opened typically fall into two categories; hinged windows and sliding windows. The expressions "castle"- and "sash" windows are frequently used for these types, however sometimes the expression "sash" has been seen used also for some hinged windows. It is further understood, that each of these categories contains specific types of windows with their specific denotations, based on how they are configured, oriented, placed and operated.

The glazing support system is beneficial in relation to windows that may be opened, however its use is not limited to these. It applies to windows which are hinged, be it at the side, the top, or by bottom-placed hinges. It applies to the "tilt-turn" variants, and is also about sliding windows, particularly those that are hung from the top, however not excluding the variant that is supported at the bottom. Windows with an opening pivot about an axis in the vertical or horizontal direction, placed anywhere along the horizontal or vertical frame members, can also benefit from the use of the proposed glazing support system.

The glazing support system enables the glass to be fixed in an improved way to the frame. This relieves the frame from the task of carrying the glass in the ordinary way. Furthermore the interaction between the frame and the glass is improved in such a way that the glass now actually may support the frame, not vice-versa, as is the practice with conventional window frames. As a result, the glazing support system enables the frame to be configured with slimmer cross sections of some or all of its horizontal and vertical members.

The glazing support system enables the frame of the window and the glass assemblies of the window to structurally interact and support each other in new and useful ways. The glass unit may be used for taking up forces in some directions. By doing this, the glass can support the window frame in those directions. This means that the frame may be utilized better.

By introducing this structural interaction between the glass and the frame, the cross-section of the frame members for such windows may be reduced. This brings several benefits, one of them being that for any given "external" window size, the glass area is increased. This gives improved visibility though the window. Another benefit is that the heat transfer through the window is reduced. Double- and triple glazed windows are more effective thermal insulators than most types of window frames. By reducing the height of the cross-sections of the frame members, and increasing the area of the glass, the combined heat transfer is reduced. This gain means that both energy loss out of the window on cold days, and heat ingress in through the window on hot days, is reduced. Yet another benefit of the invention is that, in the case of old windows, typically single-glazed with slim frame members, being replaced by new ones, it is easier to maintain the aesthetics of the old window, which typically had slim frames.

With the proposed glazing support system, as described in more detail with specific examples below, the glazing unit is suspended differently to the frame members, using a tension member such as a strap band, so that the weight of the glass may be taken up—to a great extent—by one frame member. Typically the anchoring points for the band—thus the weight—will be close to the corners of the window, which is beneficial, for both the stationary type of window as well as the type that may be opened, as this relieves the frame member which the glass assembly is fixed to, from bending stress. For the window that can be opened, it can be beneficial when the anchoring of the band is close to the hinges of the window. When the band is anchored directly to the hinges this is particularly efficient.

One implementation uses the strap band partly for strapping the frame members together (such as with tension applied from within the frame) as well as partly for strapping the glass assembly to the frame. The division of the strapping force between the frame and the glass assembly may by optimized by varying the geometry related to the strapping.

This glazing support system can result in integration of the window frame and the glass so that they mutually support each other structurally in a new and improved way. The stiffness of the glass can be used to control compressive forces in the assembly as a whole in the case where the tension member is used to secure either the glass directly to one or two frame members, or to reinforce the frame members themselves along with the glass. In either case the stiffness of the glass in compression and shear along its principal surfaces may be used to withstand the compressive forces which arise during the assembly and later of such a window.

The new method of suspending the glass to the window frame leads to less risk of glass breakage due to movements of the frame, such as induced by shocks when the window is opened and closed, or when the wall where the window is distorted due to seasonal settling of the ground under the wall. The reason for this is that typically there are some sides of the frame that are "more disconnected" from the glazing unit than they are in more traditional designs.

FIG. 1a) shows a composition used for typical state-of-the-art windows, as a reference for this description.

The window 1 is stationary, meaning that it cannot be opened. The window frame 2 is typically stepped to incorporate an integrated blind stop 3 in order to support the glazing unit 4. If the window is multi-glazed (here shown double glazed) it typically supports the glazing unit on settling blocks 5 and spacers 6. The settling blocks take up the weight load in the gravity direction. The spacers position the glass assembly in the transverse direction. The setting blocks and the spacers may be somewhat flexible in order to cushion the glass against shocks and different thermal movements of the glass and the frame. The glazing unit is further secured by the glass beads 7, holding the glass against the blind stop 3.

Figure 1B:
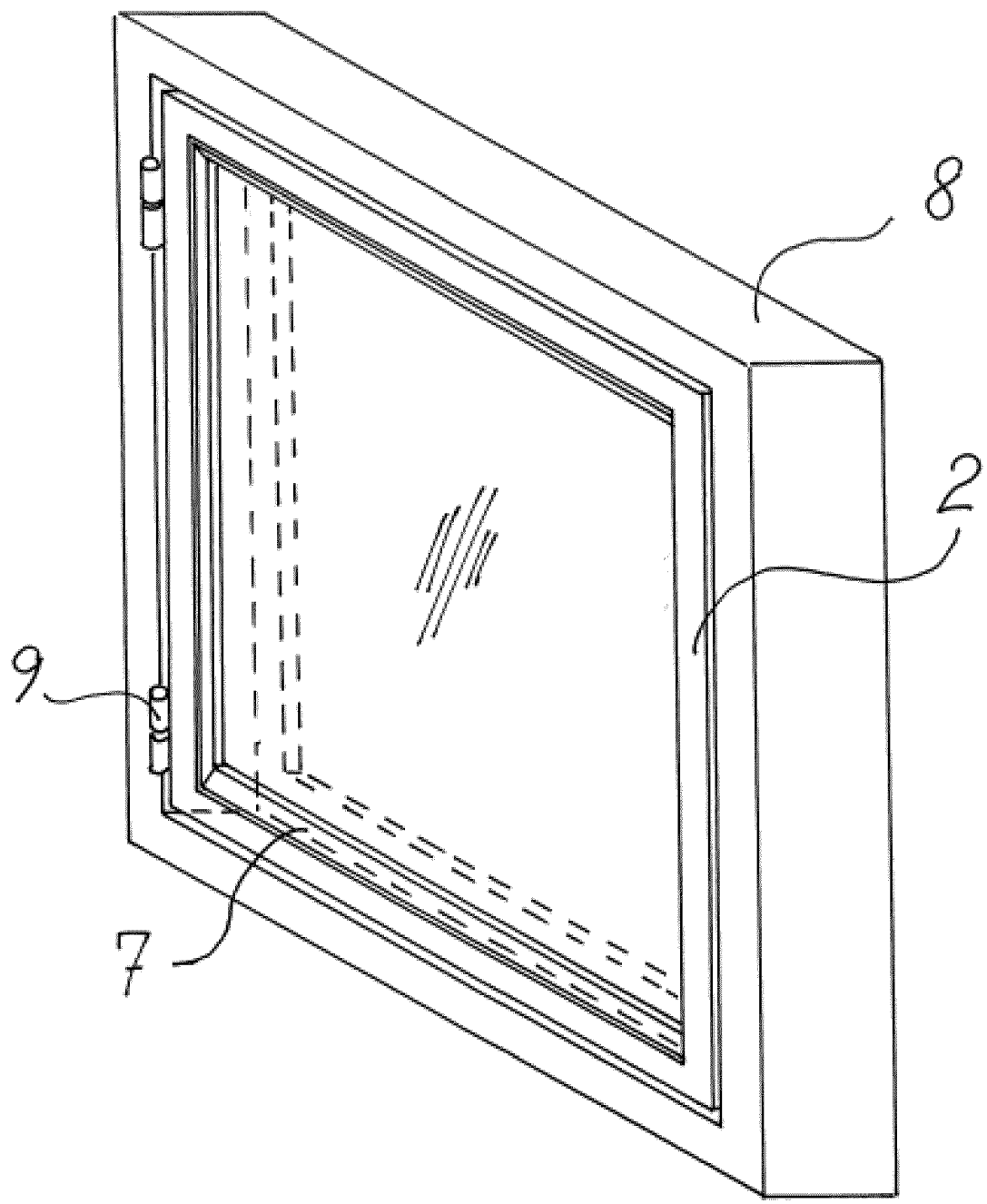

FIG. 1b) shows a window that can be opened and hence it is fixed to the stationary frame 8 with hinges 9. The glazing unit is fixed to the articulated frame 2 as to the fixed frame in FIG. 1a.

It is understood that there will normally be sealing strips between the glass bead and the glazing unit as well as between the frame and the glazing unit. These seals are not shown in these Figures.

Figure 2A:
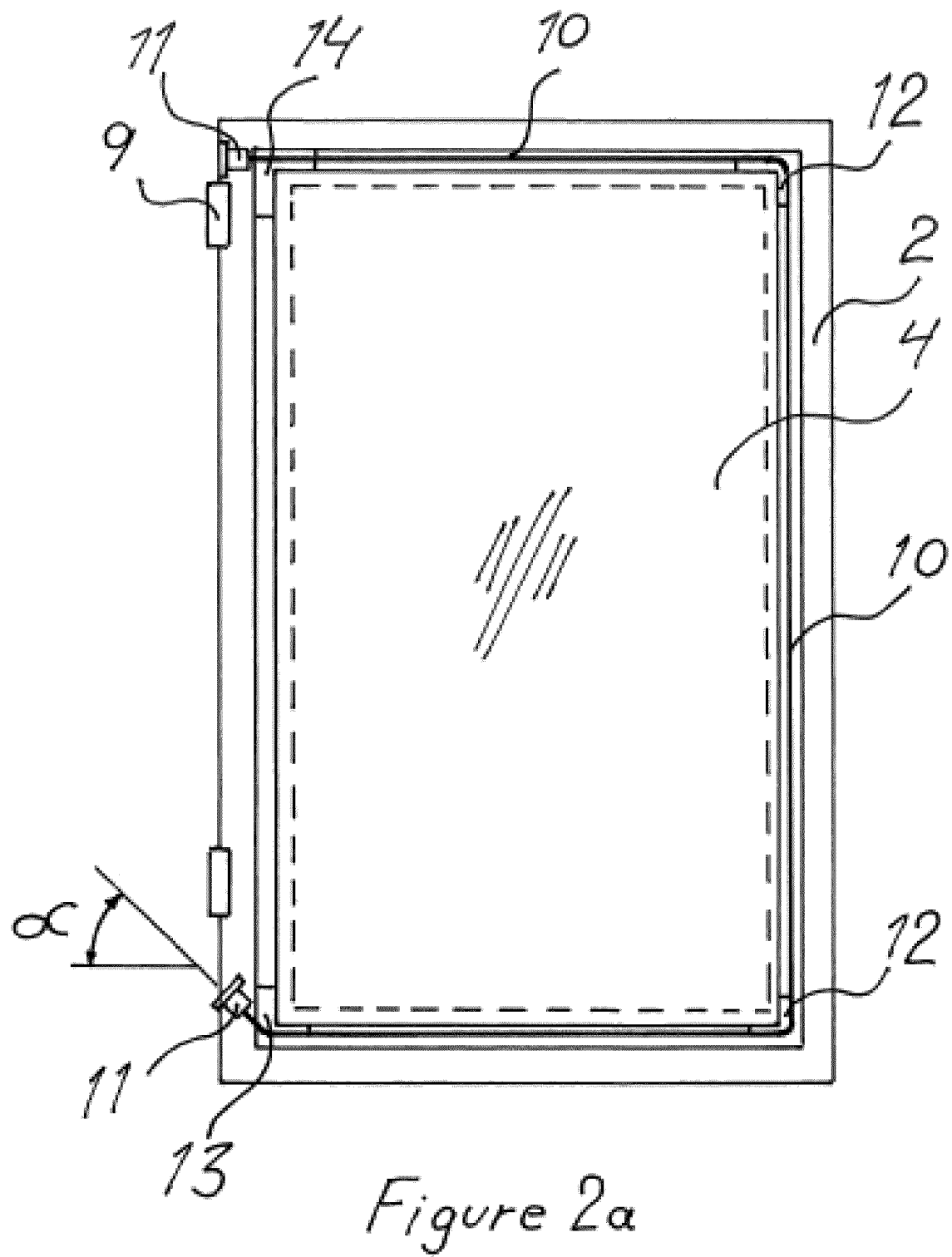
FIG. 2a shows a glazing support system using a tension member.

FIG. 2a) shows a front view of an example for a glazing support unit using a tension member. This example is based on a window that may be opened. As with the window of FIG. 1a a frame 2 holds the glass assembly 4 and the window includes hinges 9 with a vertical pivot axis. A tension member 10 is included in the form of a thin strap band 10 in metal, plastic or in polymer or another suitable material. In this example the band 10 is configured to be a "hoop" around the glazing unit 4, effectively strapping the glazing unit 4 to a frame element, which in this case comprises one frame side member, and the top frame member in one place. The strap 10 is secured to the frame 2 by the anchor blocks 11, which abuts the frame 2. The strap 10 supports the glazing unit 4 at its corners by the corner blocks 12, 13 and 14. The blocks 12 have gaps to the frame, whereas the blocks 13 and 14 are abutting the frame in respectively one and two directions. The strap 10 pulls the glass assembly to—and holds it firmly against—the hinged vertical frame member, as well as to the top frame member. The strap 10 is tensioned—and may be re-tensioned—by its fixation to the anchor blocks 11.

The top of the strap 10 pulls the glazing unit 4 in the normal direction to an inner side the frame member, whereas the bottom of the strap 10 pulls the glazing unit 4 at an angle $\alpha$ to the same member. It is understood that the tension force that follows the direction of the angled strap, can be decomposed into two force components (vectors), one being horizontal the other vertical. The "vector sum" of these forces is the strap tension force, and the distribution between them is governed by the angle $\alpha$. It is understood that either anchor block 11 may be fixed to the frame 2 at an angle, and that the respective angles may be different. It can be demonstrated that the glazing unit 4 will be in a fixed—predetermined—position also when the angles of the two blocks 11 are somewhat different—due to friction between the abutting corner blocks 13 and 14 and the frame 2.

In order to grip the window through the four corner blocks 12, 13, 14 the strap band 10 needs to be elastic in bending where it contacts the corner blocks 12 and 13, where the band changes direction. The definition of elastic is here about the resistance to bending of the strap 10, which has to happen when the band 10 initially is bent over the corner blocks 12, 13, 14, and then slides over the blocks 12, 13, 14 when the band 10 is tightened. It can be shown that such a strap band 10 may be strong in its longitudinal direction, at the same time as being "elastic" when it comes to bending.

Figure 2B:
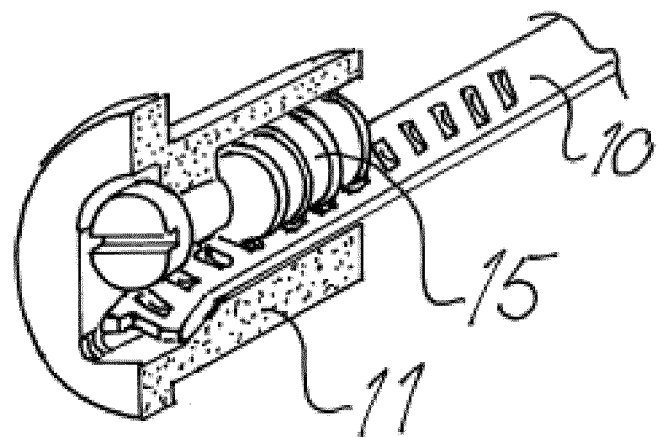
FIGS. 2b and 2c show examples of how to tighten the tension member.
Figure 2C:
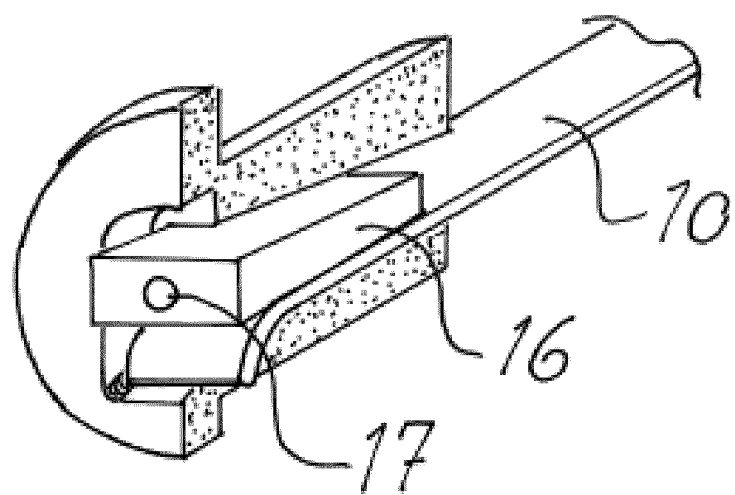

The mechanism for tensioning the strap 10 may be embedded in the anchor blocks 11. FIG. 2b) shows how this is done by screw means. Here the strap band 10—or an extension fixed to the band 10—has a toothed pattern which is formed in the band, or punched out of it. The screw 15 is in mesh with this pattern, as on a typical "Jubilee clip". By turning the screw 15, the band 10 is tightened; it may also be loosened by turning the screw 15 in the opposite direction. It is understood that the "pitch" of the screw 15 is so that the connection is self-locking, in the sense that the tension force of the strap band 10 will not make the screw 15 rotate to loosen the strap band. FIG. 2c) describes how wedge locking via a wedge 16 can be used to achieve the same effect: Again, a wedge angle which is so low that it is self-locking may be used. The wedge 16 may be pulled out for loosening and disassembly of the window by inserting a screw in the threaded hole 17, and pulling the screw with appropriate means.

There are numerous other ways of tensioning and fixing the strap band 10 in the anchor blocks 11. It is also understood that the strap band 10 may alternatively be secured directly to the hinge bodies 9, or to external corner reinforcement brackets, or to combined hinge means and such brackets. It is further understood that the means for tightening the band 10 may be in tightening devices that are positioned anywhere along the band.

Figure 3A:
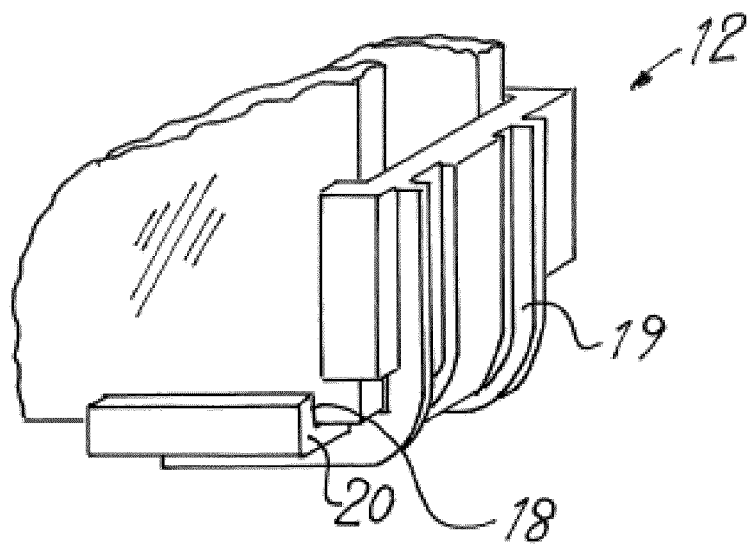
FIG. 3a shows a corner block.

The strap band 10 engages the glazing unit 4 through corner blocks 12, 13 and 14. FIG. 3a) shows a perspective view of the block 12. The block 12 is configured to be contacting the glass surfaces in the two load-carrying directions. Optionally sidewalls 18 are used to ensure that the corner blocks 12, 13, 14 are roughly fixed to the glazing unit 4 in the normal direction, however without exerting any significant guiding force in this direction, The outer surface of the corner block has "channels" with sidewalls 19 for guiding the strap 10, and it is curved where the strap 10 changes direction to wrap around the corner block 12, 13, 14, so that the strap 10 may "slide" over the corner block 12, 13, 14 when it is being tightened.

Figure 3B:
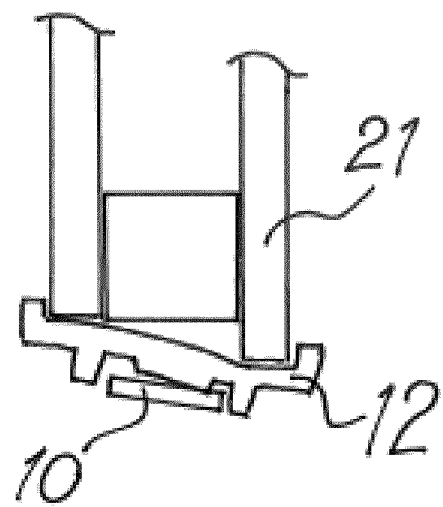
FIG. 3b illustrates flexing of the corner block in case of misaligned glazing layers.

FIG. 3b) shows how the effects of production tolerances of the glazing unit 4 are taken up by twisting flexing of the corner blocks 12, 13, 14. It is understood that due to the strap band 10 being centred in the mid-plane between each glass 21, the section of the corner block 12, 13, 14 will act as a bridge between the two glass layers 21, with the strap 10 acting on the "middle" of the bridge. This means that the force from the strap band 10 is distributed equally to the two glass layers 21. The case may be that the vertical sides of the glass 21 have some such misalignment as well. It is useful that the horizontal and the vertical parts of the corner blocks 12, 13, 14 have individual freedom to deform according to the respective misalignment of the glass layers 21. This can be achieved by having cut-outs 20 in the corner section (FIG. 3a), omitting the sidewalls at the corner, so that the corner section of the corner block 12, 13, 14 is weaker and allows individual twisting deformation of the horizontal and the vertical parts of the corner block.

It can be shown that similar beneficial elasticity and alignment in the interaction between the corner block 12, 13, 14 and the glass layers 21 of the glazing unit 4 can be achieved also when the glazing unit 4 has three or more layers, and this may be done using one or more strap bands 10.

The thermal expansion coefficient of glass is close to that of steel and this results in advantages when a steel strap is used. In other words, the changes of dimensions of glass and a steel strap will tend to "follow". This is beneficial, as this will greatly reduce the temperature stresses in the assembly. This is in contrast to current methods of fixing the class rigidly to all sides of frames which are made in wood, aluminium, plastic fibre glass fibre, or composite materials. These materials have coefficients of thermal expansion which are unlike that of glass, leading to distortions and distortion forces between the parts of the window assembly, when they expand or contract differently with temperature changes.

Alternatively, when a strap band 10 made out of fibres is used, this may be made out of a plastic which is reinforced with metal or composite- or polymer fibres which may be in a woven pattern. In the case that it is here not possible to balance the coefficient of thermal expansion with the one of glass as well as when using a steel strap, the larger differential thermal movements are taken up by elasticity in the band. It can be shown that when the coefficient of "spring" elasticity of the band—expressed by strap force versus longitudinal deformation—is low, large differential thermal movements can be taken up by the band with but a little change of the strap force.

In a double- or multi-glazed window, the outside and the inside glass 21 may experience different temperatures. This leads to the two glasses 21 having different thermal expansion (or contraction). Again, these dimensional differences are taken up in the corner blocks 12, 13, 14 according to FIG. 3b.

Figure 3C:
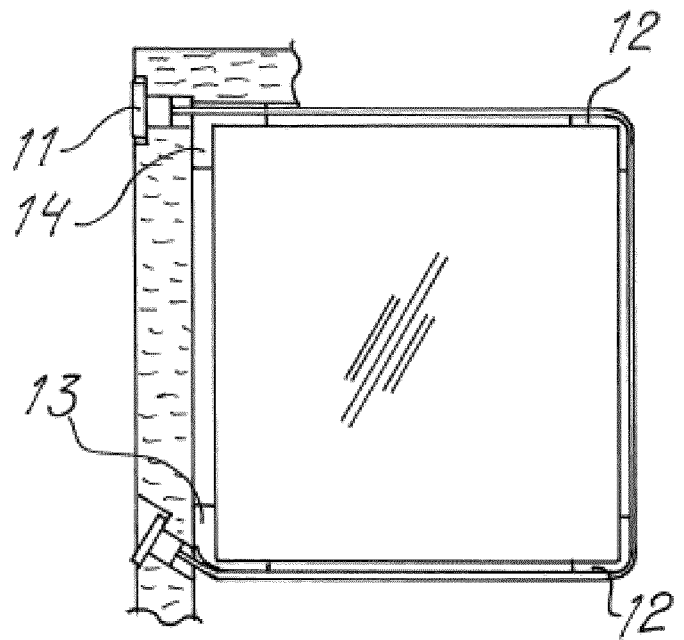
FIG. 3c shows a design for holding the glazing unit of a window.

FIG. 3c) shows a preferred design for positioning and holding the glazing unit 4 in the window frame 2: Due to the forces from the strap 10 acting upon the glazing unit 4—as elaborated in a previous section—the glazing unit 4 pushes the upper left corner block 14 against the vertical frame member that houses the anchor blocks 11, as well as against the top horizontal frame member. The lower left corner block 13 is pressed against the vertical member only, whereas the blocks 12 on the right hand side (in this Figure), i.e. the corners located away from the anchor blocks 11, are not in such a contact with the adjacent frame members, such that these frame members are not contributing significantly to supporting the window in the gravity direction and towards the vertical frame member with the anchor blocks. It is clear that by this method, the frame members are significantly relieved compared to the current methods for holding the glass, hence they can be made slimmer than the current members. The vertical load on the top frame member is at a position at the corner where it is fixed to the vertical frame member. Due to this, neither a significant bending moment that acts on this horizontal member is set up due to the vertical force, nor must the top frame member have to be dimensioned to take up such a significant bending moment. In other words the top frame member may be slim, even if a force is acting upon it.

Figure 3D:
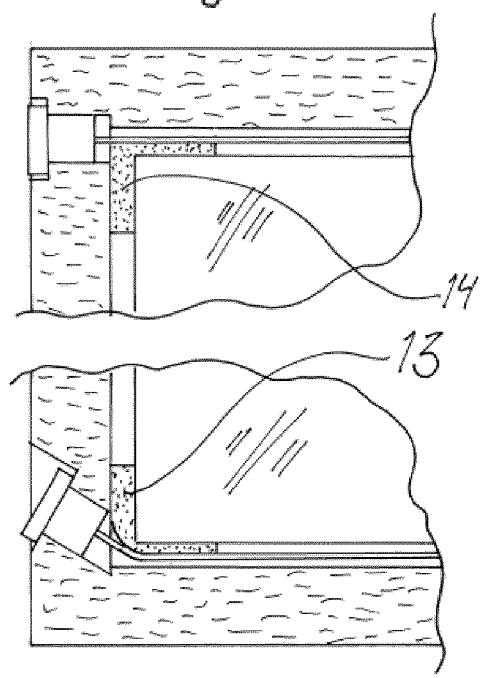
FIGS. 3d, 3e and 3f show details and variations of the design of FIG. 3c.
Figure 3E:
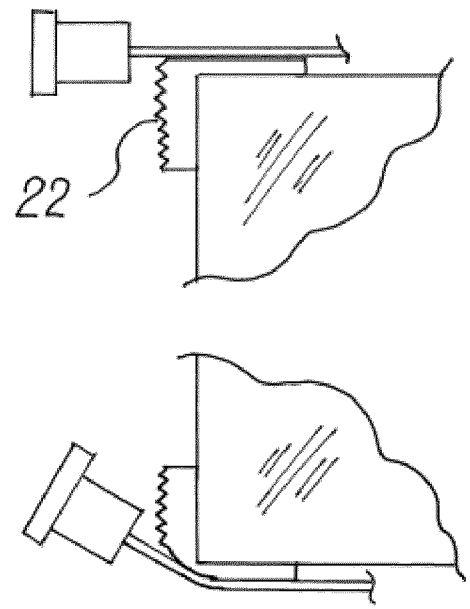

FIG. 3d) shows another preferred design, where the vertical component of the strap force is taken up by friction between the corner blocks 13 and 14 and the vertical frame member that they are abutting. In this case there is no structurally significant contact between the corner block 14 and the top horizontal frame member. FIG. 3e) shows how the corner blocks 13 and 14 may have a serrated (toothed) surface 22 that will produce a "form lock" by the action of the teeth embedding in the frame surface when they are forced onto the surface by the strap band 10. In particular, when the window frame 2 is wooden or is in a polymer material, the embedding will take place due to the softness of these materials. If the window frame 2 is made out of a "hard" material, such as aluminium, the frame member itself may be serrated in these contacts. It is understood that other mechanisms could also be used to achieve the same effect, such as pins, an end stop protruding from the vertical member, the bracket sitting in a recess in the frame member and so on. Further the corner bracket 14 may be fixed to the vertical member such as by bolting, riveting, bonding and so on, which will give the same effect. In this case, the tensioning mechanism, such as shown in the FIGS. 2b) and 2c), may be integrated in the corner bracket 14. This also applies to the bracket 13 if this is also secured to the frame 2 in a similar manner.

Figure 3F:
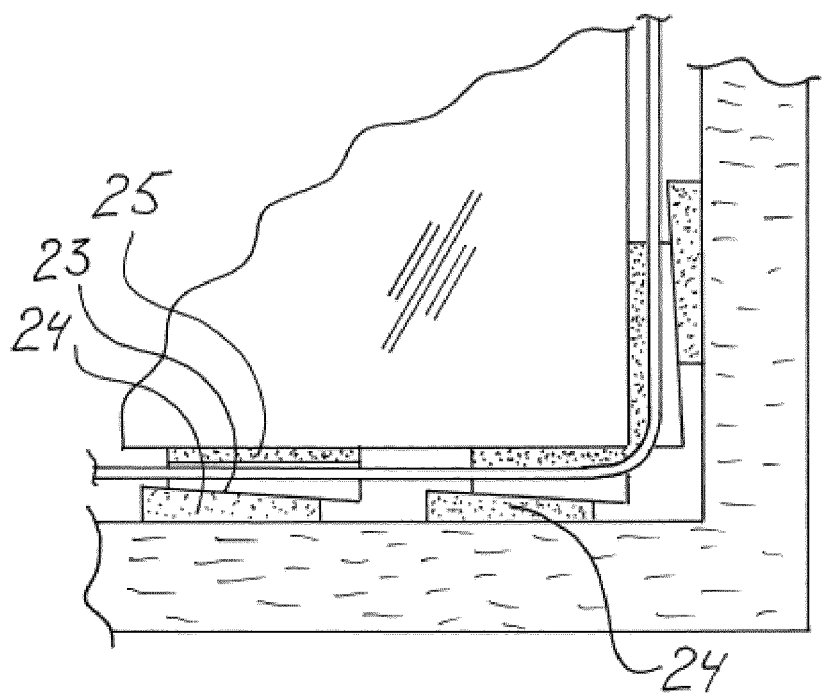

Once the glazing unit 4 has been fixed to the frame 2 in the manner that has been discussed, the glazing unit 4 may be used as a resource for supporting the slim frame 2. In other words, contrary to the prior art methods where the frame 2 supports the glazing unit 4, the glazing unit 4, now fixed to one vertical frame member, may give some support to the remaining members, allowing for even more slender frame members to be used. The glazing unit 4 gives itself to such a task, once being strapped, as the glass is strong in bending, shear and compression. One method for benefitting from this, as seen in FIG. 3f), is to use wedge spacers 24 which contact some of the corner brackets, or contacts the cut sides of the glazing unit 4 in places by the means of blocks 25—again with an angled contact interface 23. The spacers/blocks 24 and 25 will typically be made in a plastic material, and they may have a pre-determined resilience, taking up any differential movements between the glazing unit 4 and the frame 2, as well as cushioning the glazing unit 4 from any shocks and misalignments which the frame 2 may be subjected to, due to external influences. Typically, the corner blocks 12, 13 and 14 may also be in a plastic material, and may also have some resilience built into them.

It is understood that the size of the contacts between the corner blocks 12, 13, 14 and the glazing unit 4 is governed by the forces which are transferred from the blocks to the glazing unit 4, which again is depending on the thickness of each glass layer 21 in the glazing units 4, and the size of the glass, so that the contact pressure acting on the glass is within what the glass can take. In other words, the size of the contact blocks may vary according to the size of the window assembly. Typically there is a range of contact blocks 12, 13, 14, where each size is catering for a glazing unit 4 within a certain size range.

Figure 4A:
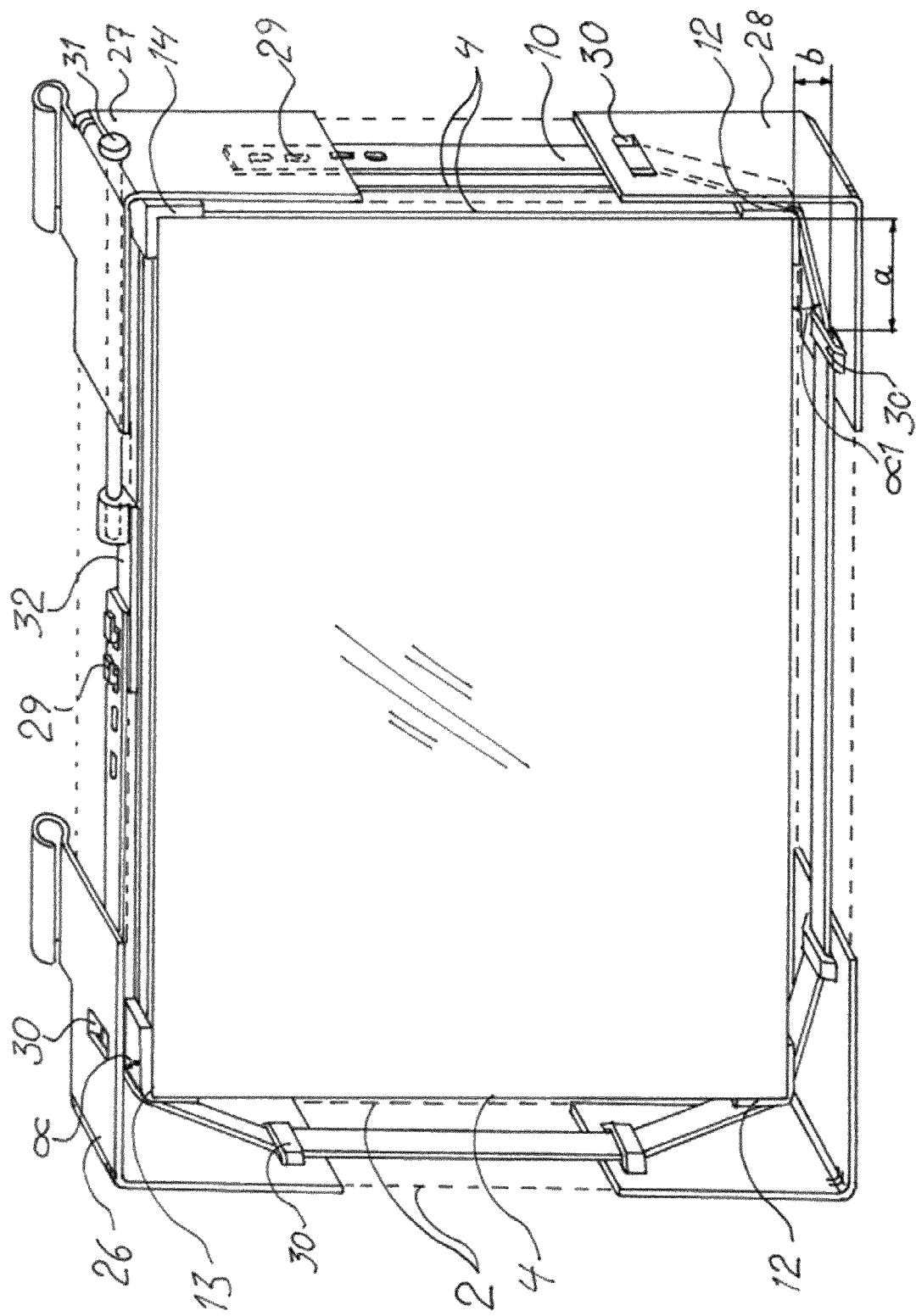
FIG. 4a shows an arrangement with a tension member join via bridge connectors to corner brackets.

FIG. 4a) shows an embodiment of the window that enables particularly narrow (slim) frames surrounding the glazing unit 4. For clarity the frame members 2 are shown as dotted lines in the Figure. The corner bracket 12 is clamped to the window by the strap band 10. As before, the corner block 13 is pressed against the frame by the action of the strap; hence it is thicker in this direction. It is further noted that the bracket 14 is held against both the vertical and horizontal frame members adjacent, hence being thicker in either directions. As before, there is no direct contact between the corner brackets 12 and the frame 2. The window may have four external corner brackets 26, 27, 28 that may be made out of a metallic material, typically from sheet metal. One pair of the corner brackets 26 and 27 may have hinge means incorporated, whereas the other pair of corner brackets 28 are without hinges. In this Figure the window has hinges at the top, but it could also be hinged at any other side. One of the hinged corner brackets 27 has anchoring means for the strap band 10. This may consist of one or more integrated hooks 29 that protrude—preferably—inwards, which the strap band 10 is hung onto. It is understood that the strap band 10 may be perforated locally for this purpose. It is also understood that the band 10 may have such holes at equal spacing to each other along its length. Such a band 10 may be produced in great lengths, then cut into the length commended by the specific window which is built, before or during the assembly of the window. Other anchoring systems could be used if required.

Figure 4B:
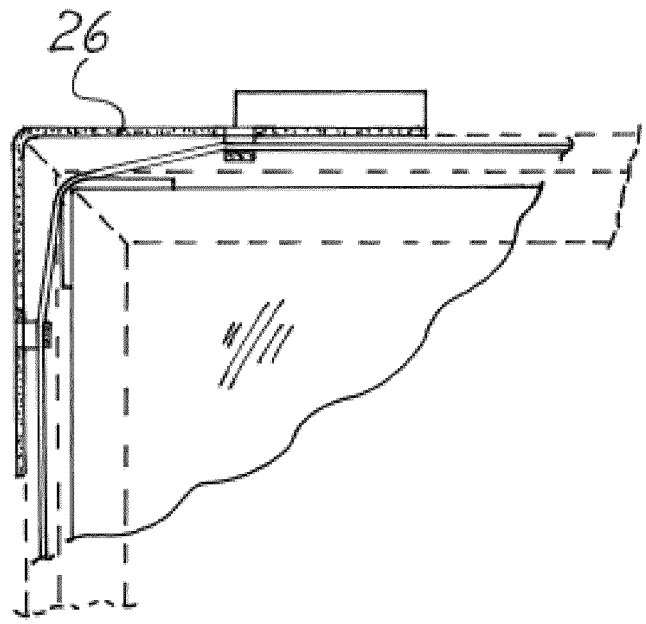

At the upper side of the window where the corner brackets 26, 28 include hinges then the external corner brackets 26, 28 have integral anchorage bridges 30 that connect the strap band to the brackets 26, 28. As in the previous sections, the strap band 10 presses against the glazing unit 4 via the corner blocks 12 and 13, hence strapping around the glazing unit 4 as before. The angle $\alpha 1$ between the band 10 and the glazing unit 4 is governed by the distance a and b between the corner of the glass. It can be shown that $\alpha 1$ governs the force onto the glazing unit 4 as well as the "anchorage" force from the band to connectors at the brackets 26, 27, 28, which are formed by bridges 30, and hence $\alpha 1$ also governs the force onto to the brackets 26, 27, 28. As shown in FIG. 4b) the anchorage forces pull the external bracket 26, 27, 27 to frame members (in dashed lines in FIG. 4b)—which abut each other in the angled cut interfaces. In other words the corner of the frame—consisting of the frame members and the external corner bracket—is pressed together by these forces. The same applies to the corner which is reinforced by the corner bracket 26 at the top left in FIG. 4a, here governed by the angle $\alpha$. The same applies to the corner of the corner bracket 27, at the top right in FIG. 4a). Here, the corner bracket 27 includes a tensioning mechanism for tightening the strap 10 via a screw 31 that engages with a pull bar 32 by a threaded connection. The pull bar is fixed it to the strap 10, for example by the hooks 29. Tightening the screw 31 tightens the frame together, at the same time as fixing the strap 10 around the glazing unit 4, as shown in previous sections.

Interestingly, the strapping action of the glazing unit 4, and that of the frame 2 is geometrically independent. The strap band 10 will tighten the glazing unit 4 as it is, and the same applies to the frame 2. This is useful, as the glazing unit 4 is produced with geometrical tolerances, as is the frame 2. The method of strapping is using the strength and stiffness resources of both the glass— and frame assembly, and coupling both assemblies to act as one unit, however with a bias to securing the glazing unit 4, as governed by the angle $\alpha 1$. Typically, the angle $\alpha 1$ will be between 5 and 30 degrees, whereas typically the angle $\alpha$ will be between 30 and 85 degrees. As said, by varying these angles the strapping forces onto the glazing unit 4 and the frame assembly are optimized.

It is now possible to define a geometry of the assembly that provides a distribution of the strapping force between the glazing unit 4 and the frame members, by optimizing the angle $\alpha 1$ of FIG. 4a through the distances a and b. This enables the assembly to be optimized so that the glass, which is stiff in bending about an axis perpendicular to the glass surface, supports the frame, which, having slender members—is not effective in this respect. This structural support is balanced so that the extent of the support is so, that any shocks to, or distortions of the frame caused by external influences, is not transferred fully to the glass, in order to cushion the glass.

The FIGS. 4b), 4c) and 4d) shows details of the window in FIG. 4a), as well as some further features and variations which may be combined with it. FIG. 4b) shows that the frame members may meet in a Vee-cut instead of the usual finger joint. This is a great simplification of the production and assembly of the window frame. The corner bracket 26 is effectively holding the frame members together. The abutting faces may optionally be glued together, and further secured by self-tapping screws 45 (FIG. 4c)) going through the bracket 26 into the frame members.

Figure 4C:
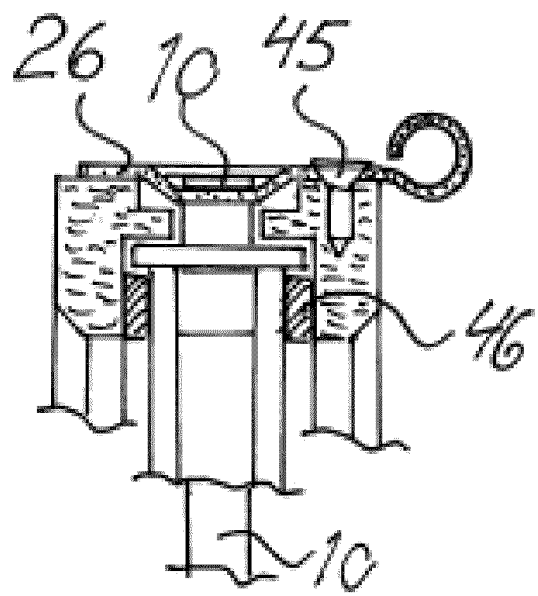
Figure 4D:
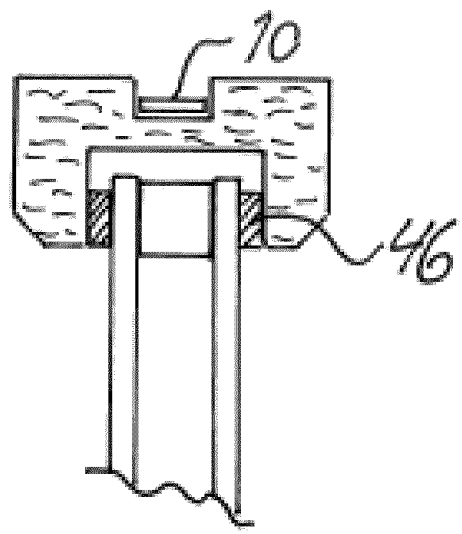

FIG. 4c) shows a cross-sectional cut through the corner bracket 26 and the frame member 2 of FIG. 4b), and FIG.

4*d*) shows a corresponding cross-section outside the corner bracket. It is seen that the glazing unit 4 can be "held" in the direction opposite to the "strapping plane" by a single frame member—contrary to the current practice of using a separate glass bead—as shown in FIGS. 1*a*) and 1*b*). In FIGS. 4*c*), 4*d*) and 4*e*) sidewalls of a channel in the frame member are used to hold the glass through sealing strips 46. The method of joining the frame members enables this cost effective solution. It is understood that the window frame must now be taken apart—should there be a need for replacing the glass in the frame. This drawback must be considered in relation to the lower production cost of the frame. Further, in some cases it may make it more economical—and quicker— to replace the window as a unit, instead of labouring with replacing the glazing unit 4 alone.

Figure 4E:
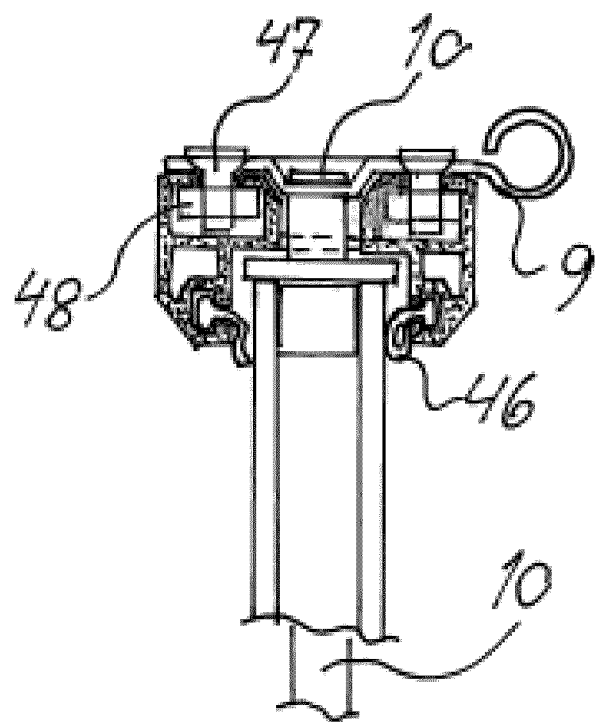
FIG. 4e is a cross-section through an alternative arrangement for the design of FIG. 4a, using hollow extruded sections in place of solid parts.

FIG. 4*e*) shows a cross-section of a plastic, plastic composite, glass fibre or aluminium or brass frame in place of the solid frame shown in FIGS. 4*c*) and 4*d*). The frame members are typically made as hollow chamber extrusions or pultrusions in their longitudinal direction, however may also be rolled-formed from sheet metal to an open section beam. These are economic and effective ways of producing lengths of them, which are later cut into the lengths commanded by each window.

The hinge 9 may be secured to the frame profile by screws 47 that engage insert nuts 48, which are rotatably locked to inside walls of the hollow section profile. Blind rivets may optionally be used instead of screws.

It is noted that after the basic assembly operation is done, and the strap 10 is tensioned, then the modules in FIG. 4*a*) may further be secured by fixing one or more the frame members positively to the external parts of the tensioned strap band 10 by screws or nails. Typically, pre-punched holes in the band 10 may be used for this.

Figure 5A:
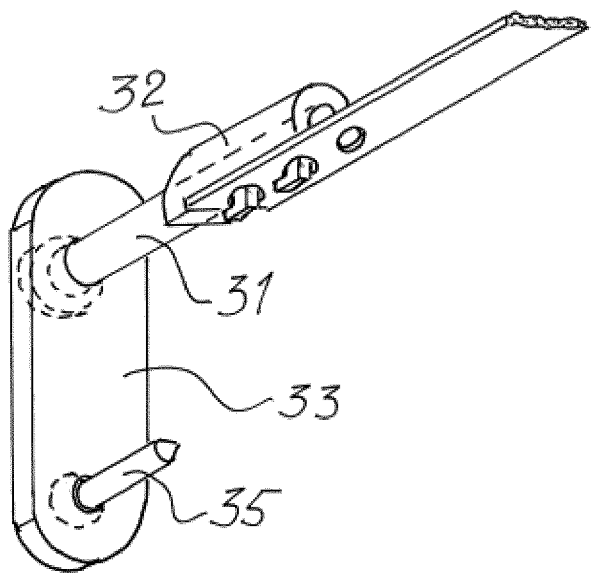
FIGS. 5a and 5b show possible anchoring systems.
Figure 5B:
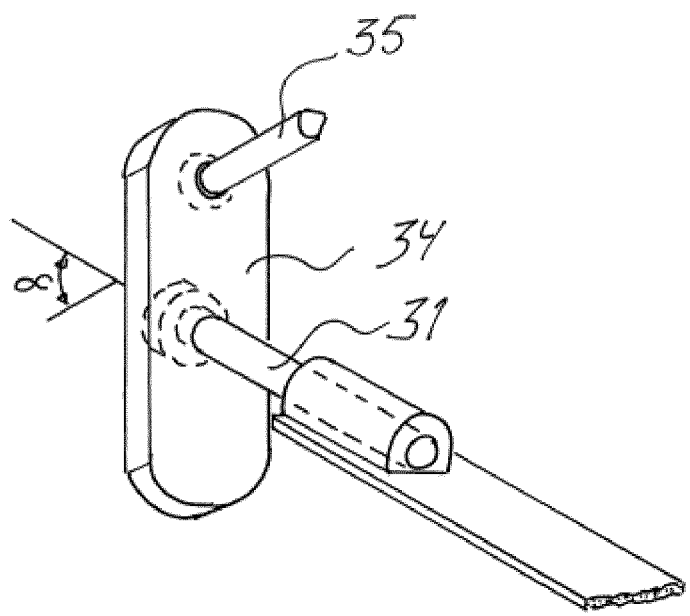

FIGS. 5*a*) and 5*b*) shows further variations that may be used as the anchoring systems in the previous sections, i.e. the anchor blocks 11 and tensioning mechanisms linked to the anchor blocks. Here the anchor blocks 11 take the form of anchor plates 33 and 34, which are respectively intended for the top and the bottom fixation of the band 10, which may be tightened with a screw- and pull-bar 31 and 32 similar to that shown in a previous section. The anchor plates 33, 34 may be further secured to the frame member by a screw 35. The screw that is abutting plate 34 for attachment of the tension member (strap) 10 may be positioned in the angle α, so that the angled pull direction is secured as before. This is a simple and effective way of anchoring the strap 10, and has the benefit of spreading the strapping forces onto a large surface area of the frame member via the anchor plat. It should be noted that this method of anchoring the strap may be used on both the strapping system as shown in the FIG. 2*a*), as well as shown by FIG. 4*a*).

Figure 6A:
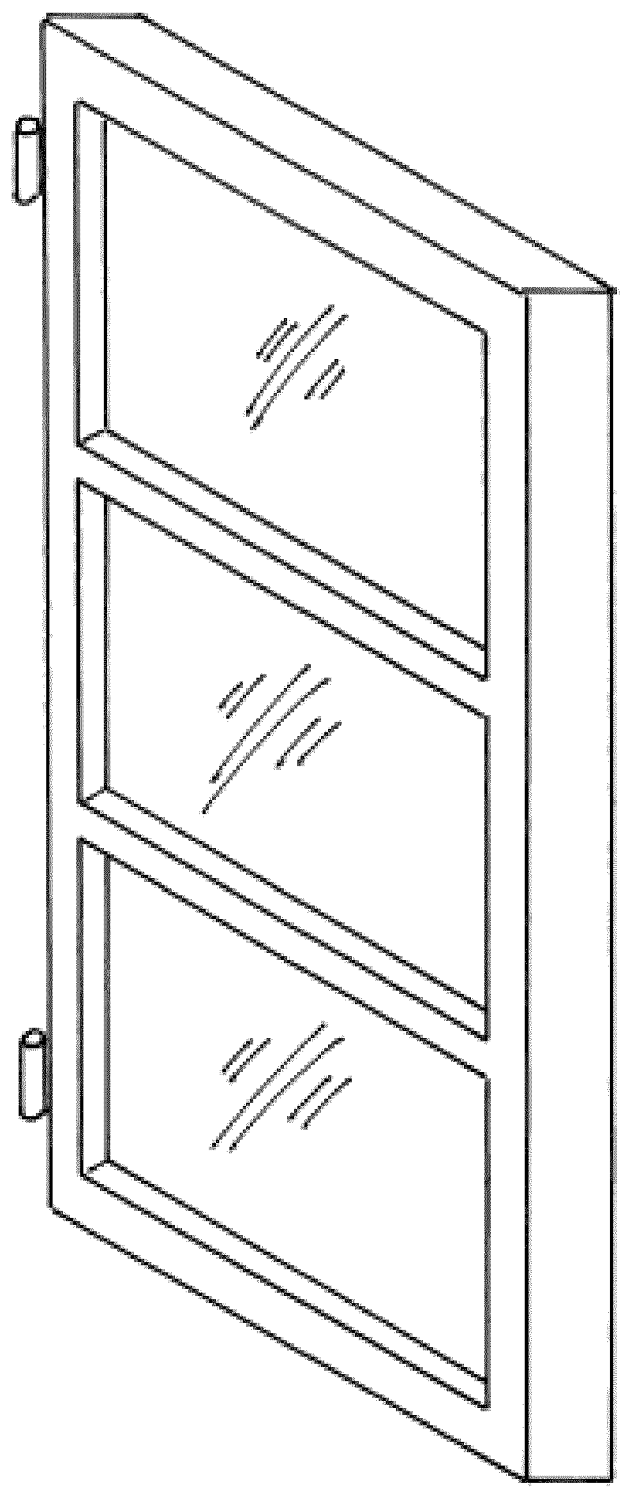
FIGS. 6a, 6b and 6c illustrate possible arrangements for supporting multiple glazing units on a single frame element.
Figure 6B:
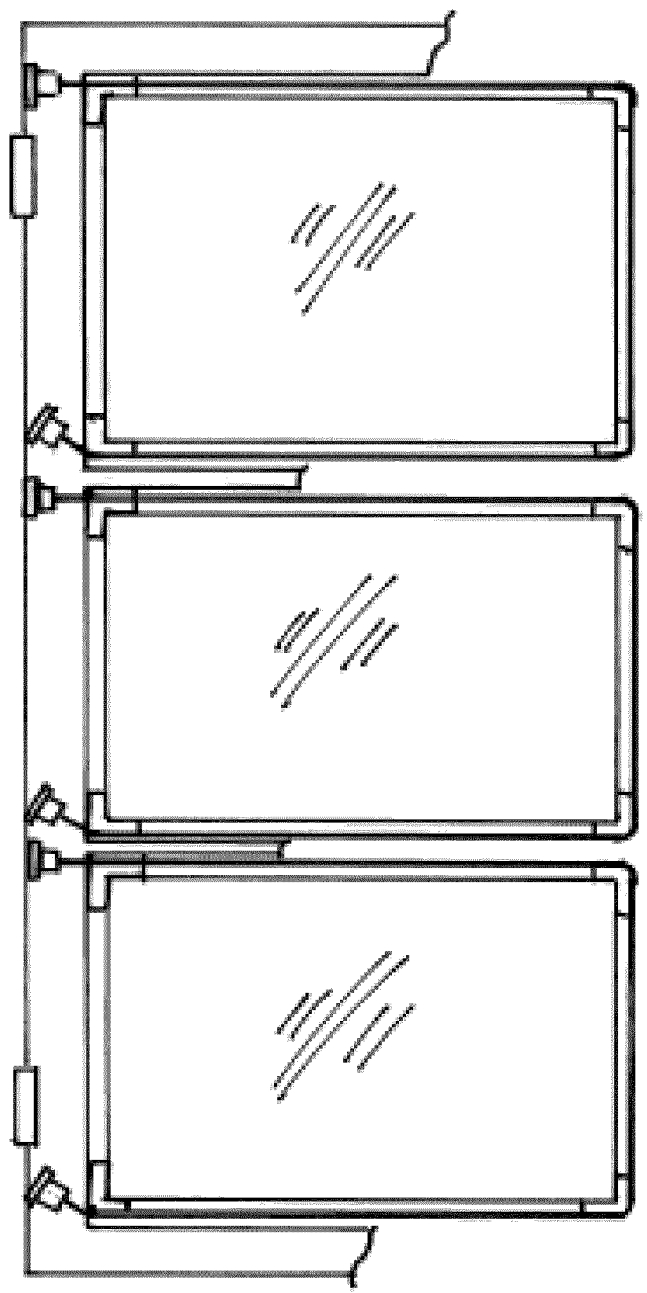

For reasons of tradition or aesthetics, a window may be split so that it uses two or more glass assemblies in the same frame. FIG. 6*a*) displays such a window, here with three glazing units 4. FIG. 6*b*) shows how these are secured each with an individual strapping system, as before. Here, the reaction forces of the anchoring points between the hinges 9, tend to balance each other, as they are pairwise in the opposite direction, as shown in FIG. 7*b*).

Figure 6C:
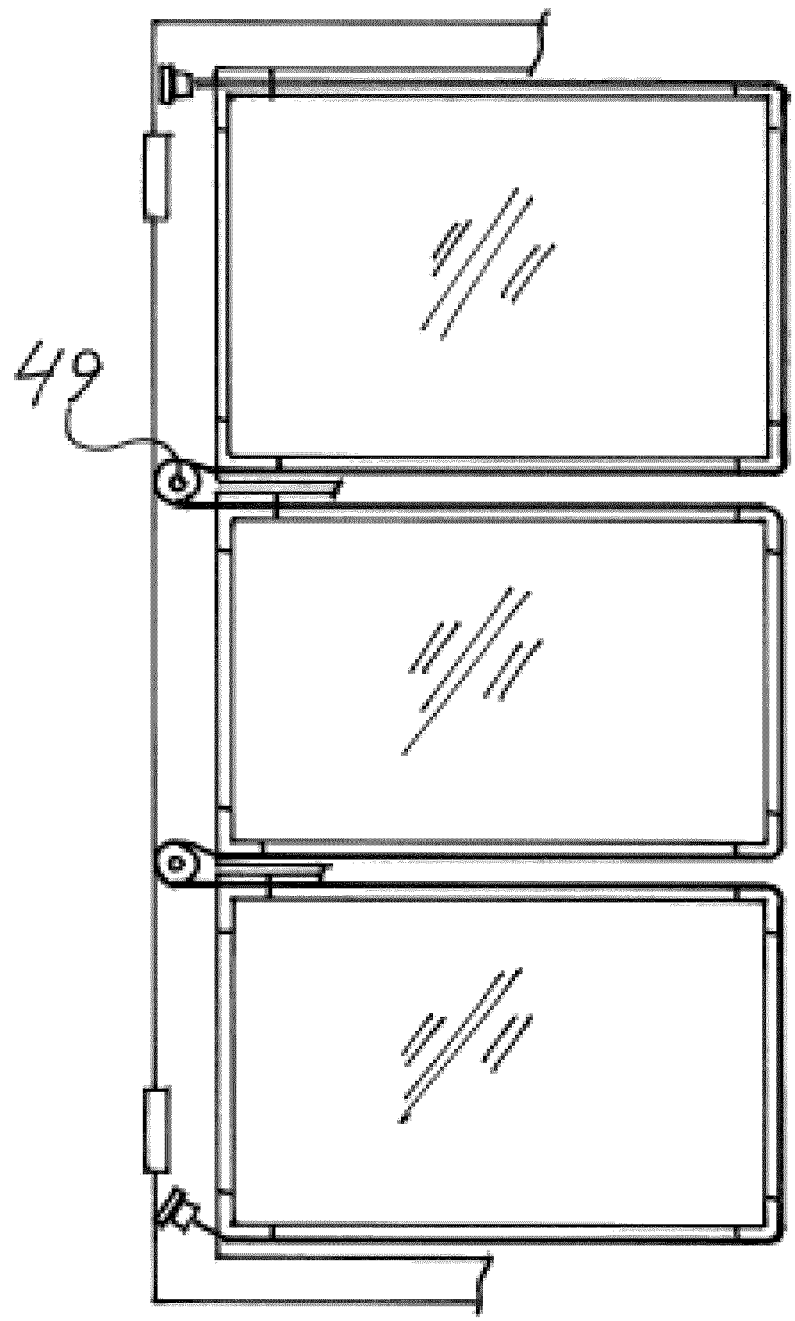

FIG. 6*c*) shows how a single band 10 may be used for securing all three glazing units 4, by running over a pulley 49 that is rotatably fixed to the frame member, between the glazing units 4. In this way the direction of the band 10 is reversed, at the same time as the strapping force is maintained. It is noted that the device for reversing may be non-rotary, in which case the band 10 will partly be locked to this anchorage (as may be calculated by the so called Capstan equation—sometimes phrased the Eytelwine formula). This may be beneficial in some cases.

Figure 7A:
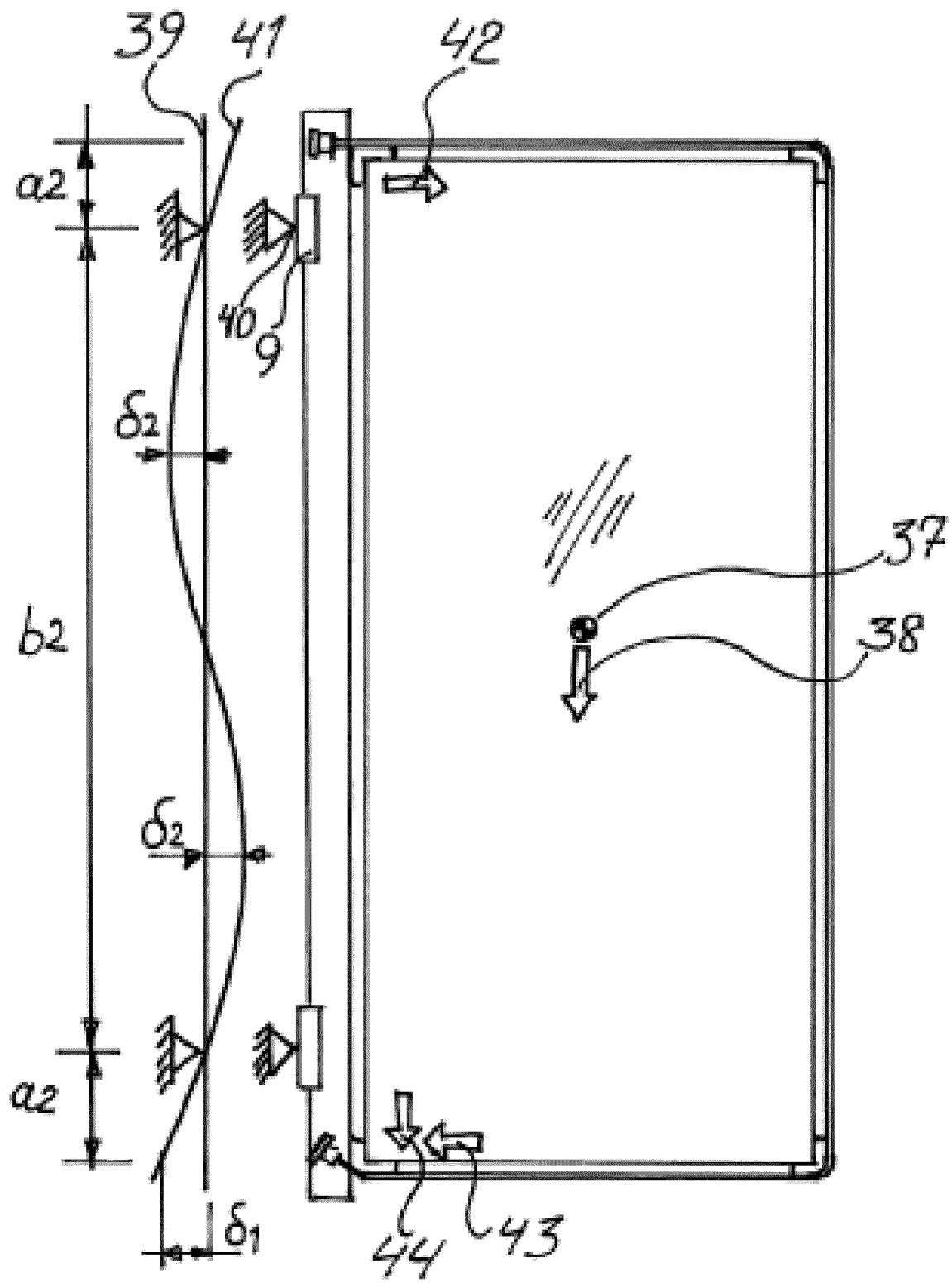
FIGS. 7a and 7b illustrate calculations of deflections of a vertical frame element resulting from moments applied with the proposed glazing support system.

FIG. 7*a*) shows how the gravity force on the glazing unit 4 acts to deform the vertical frame member onto which it is hung. The resultant gravity force 38 is located at the centre of gravity 37 in the middle of the glazing unit 4. By using "moment equilibrium conditions" it is straight forward to calculate the resultant horizontal forces 42 and 43 that needs to be taken up by the frame 2. The vertical force 44 corresponds to the force 38. We can here assume the hinge points 9 and 40 to be (translatoric) fixed in the relevant directions. Based on this, the distance a2 sets up the bending moments that subjects the member to deformations. Once the cross-sectional dimensions are defined, the deformations (deflections) δ1 and δ2 are determined. It can be shown that the deformations can be kept low, with a slender cross section of the vertical frame member, when the distance a2 is small compared to the distance b2 between the hinges. It is also seen—everything else being the same—that the deformations are directly proportional with the distance a2. From this it is deducted that the closer the hinges 9, 40 are to the anchoring points, the less the deflections are going to be. This is important, as this effect allows for even slimmer frame members when this is exploited. The "bending line" 41 is shown in the Figure, comparatively to the straight non-bent line 39.

Figure 7B:
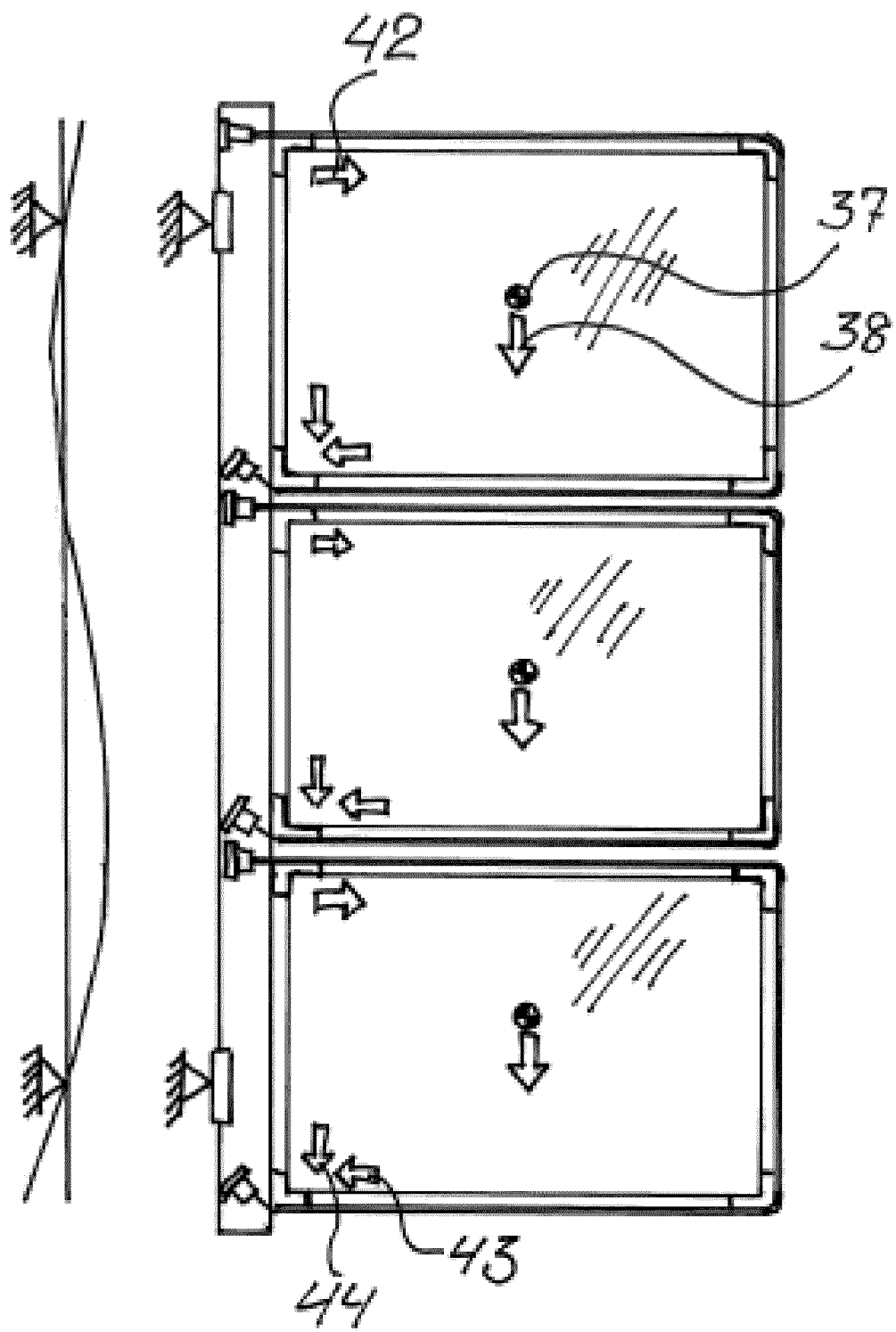

FIG. 7*b*) shows the same effects, for the arrangement with three glazing units 4. The resultant bending line 41 compared to the straight non-deformed state is shown. It can be shown that the effect of the reaction forces acting against each other is positive.

Figure 8:
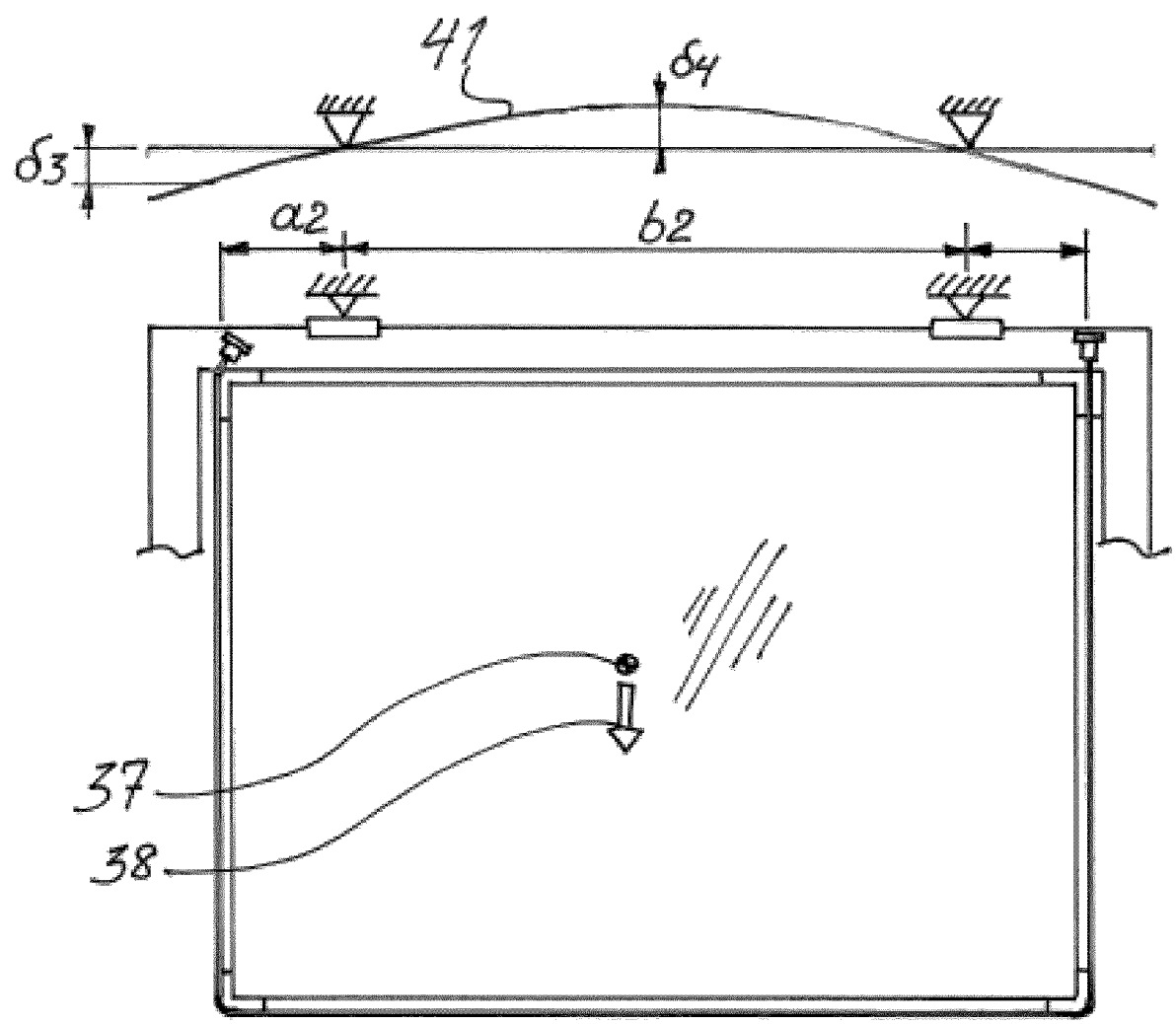
FIG. 8 shows similar calculations for a horizontal frame element.

FIG. 8 shows a similar effect, as happens when the window is hung from the top. The gravity force resultant 38 again is at the centre of gravity 37 in the middle of the glazing unit 4. The deformations δ3 and δ4 are governed by the weight force of the glazing unit 4, the distances a2 and b2 as well as the cross section of the horizontal beam. Again, it can be shown that reducing a2 directly reduces the deformations and strain on the frame member.

Figure 9A:
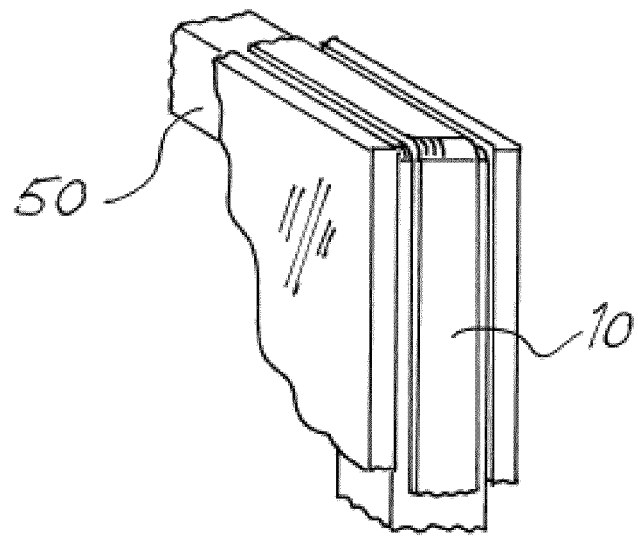
FIG. 9a shows how the tension member may bear on the sealing spacer between glazing layers of the glazing unit.

In some variations of the glazing support system the circumferential sealing spacer between the glasses in the glazing unit 4 is used for taking up the strap loads, as shown in FIG. 9*a*): The sides of the sealing spacer 50 between the glass layers are fixed to them with a large bonded surface, hence this connection has a large capacity for taking up shear loads. It then goes that the strap band 10 may support the glasses by supporting the sealing spacer—without the use of the corner brackets 12 as shown in prior Figures. The corner brackets 13 and 14 in the prior Figures may still be used to control the distance of the glazing unit 4 to the frame members, however the strap 10 now runs through these, exerting forces to them through the glazing unit 4.

Figure 9B:
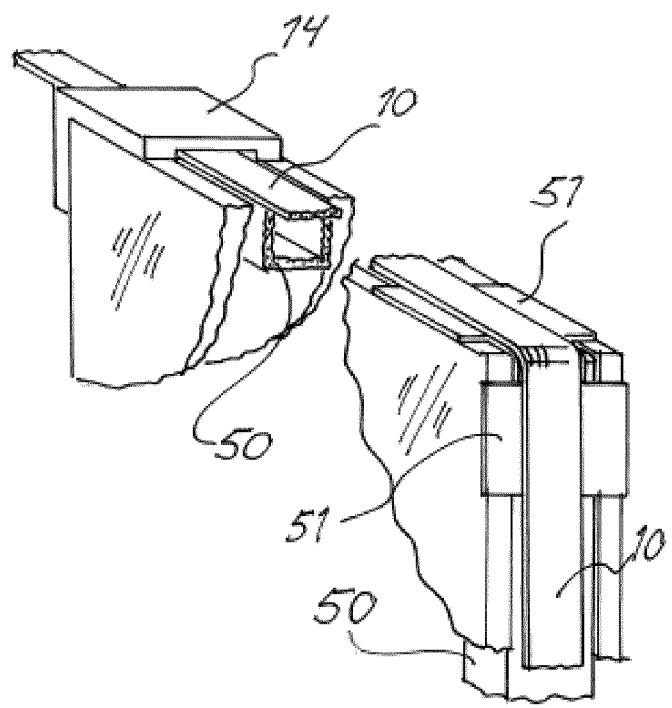
FIGS. 9b, 9c and 9d show various alternative designs for corner blocks to transfer forces from the tension member to the corner of the glazing unit.
Figure 9C:
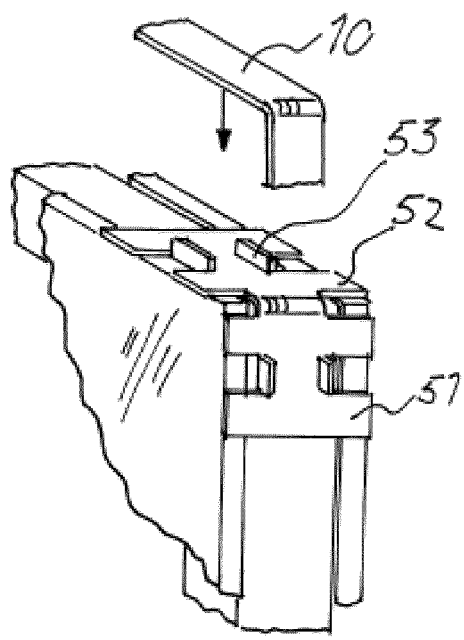

With this method of securing the glazing unit 4, it may sometimes be useful to distribute the loads from the strap band 10 between the spacer and the glass layers. FIG. 9*b*) shows how this is done by having a corner block 51 that transfers the loads from the strap band 10 to the sealing spacer profile 50, as well as to the cut edges of the glass. It is understood that each glass is cut with tolerances, and that the sealing spacer is cut and folded to follow the edges of the glass, with tolerances as well. Hence, the outer surface of the sealing spacer does not necessarily follow the glass edges geometrically. To solve this problem, in order to be able to exert force on both the spacer and the glasses, the corner block 51 is flexible. One way of doing this is shown in FIG. 9*c*): Here the corner block 51 is thin and have flexible fingers 52 that overlap and contact the cut sides of the glass. The flexibility of such a section of the corner block can be predetermined by the thickness and material specification of the bracket together with the "cut" geometry of the flexible fingers. Parts of the cut-outs between the fingers may be folded so that they act as guiding and centralizing means (53) for the strap band. It is understood that when the outer surface of the sealing spacer is situated lower than the cut sides of the glass, the corner block first abuts the glass, then flexes due to the pull force of the strap band 10, until it contacts the spacer surface and transmits a portion of the load to this surface as well as to the glass. The distribution of the pull force between the glasses and the sealing spacer is depending on the stiffness of the bracket fingers together with the difference of positions between the cut glass and the spacer surface.

Figure 9D:
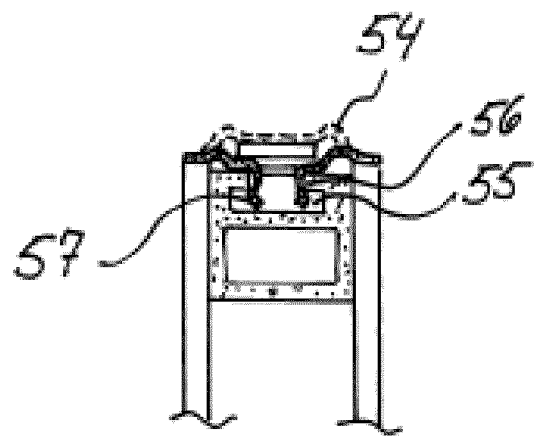

FIG. 9d) provides a cross sectional view through the glazing unit 4 with a corner block and a strap band. Here the dotted line 54 shows the geometry of the corner block before it is tensioned to the glazing unit 4 by the strap band 10. By having such a geometry of the bracket, it will abut the seal surface together with the cut sides of the glass, even if the seal surface stands "higher" than the glass. It is further noted, that the sealing spacer may have a co-extruded open chamber 55, where the edges 56 at the exit of the chamber is used for clipping the bracket to the glass unit. The integral clips 57 of the corner block are formed from the bracket sheet. Each side of the corner block may have one such pair of clips.

It is understood that the corner blocks in this example may alternatively be made in a plastic material, they will then typically tend to be thicker than when made in a metal. A metal-reinforced plastic part may beneficially be used as well, and in that case typically the contact interface to the glass will be plastic.

Figure 10:
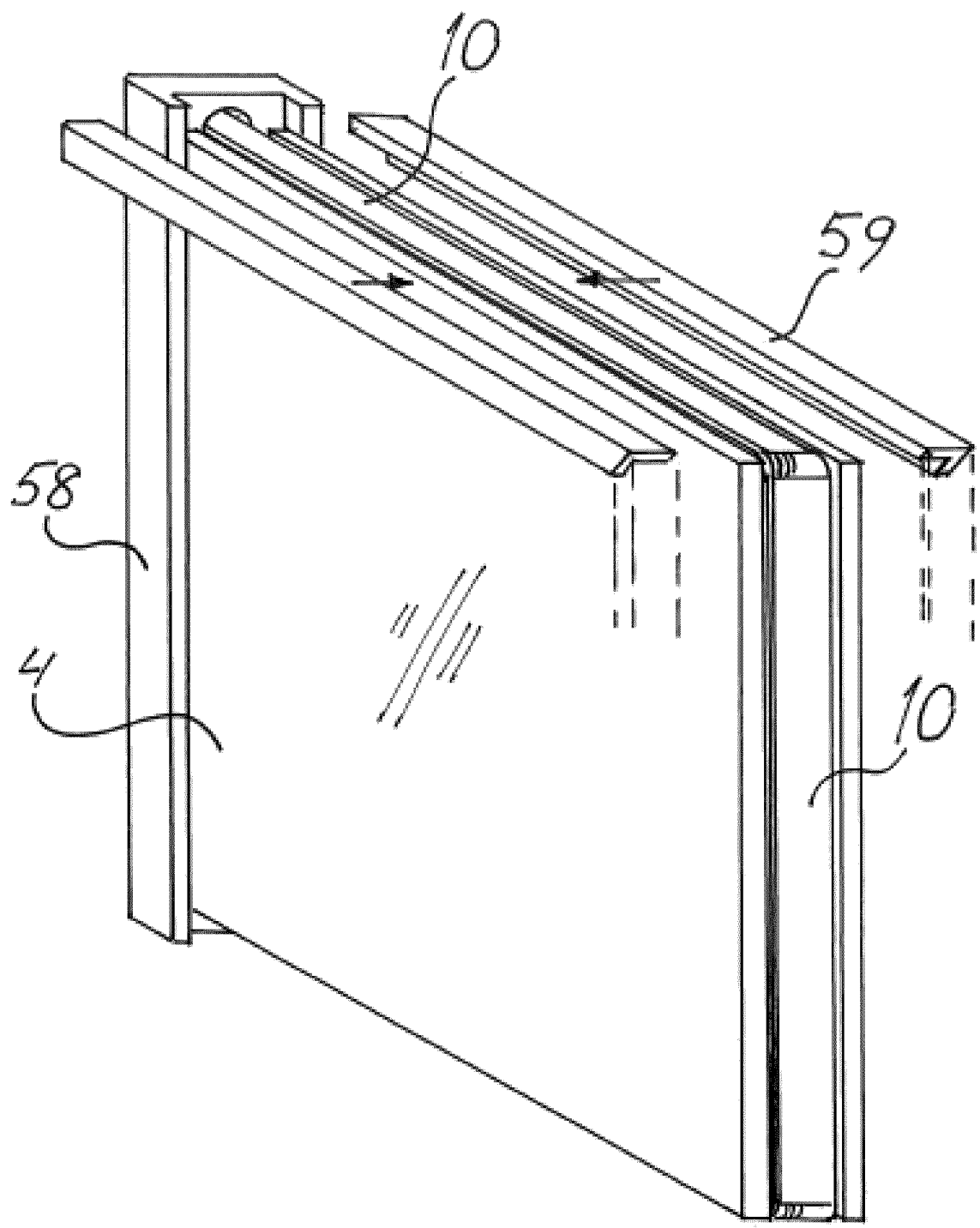
FIG. 10 shows a possible "frameless" window arrangement using the proposed glazing support system.

FIG. 10 shows a window that uses the glazing support system to achieve a "frameless" solution. This is "frameless" in the sense that the glazing unit 4 is not surrounded by a circumferential frame. Here only the vertical member 58 is carrying the glazing unit 4 as described in previous sections, by the strap 10, which is secured at either end to the vertical member 58 as also described earlier. The cut glass sides are protected by the cover strips 59, which may be clipped or bonded to the glass, or secured by other means. It is understood that the cover strips are not carrying any structural loads in this window assembly, and that they may contain sealing means such as sealing lips. The handle assembly 60 is fixed to the glazing unit 4, typically abutting the sides of the glass as well as being fixed to the sealing spacer 50 (not shown) between the glasses by small diameter screws (not shown) or by other means.

Figure 11:
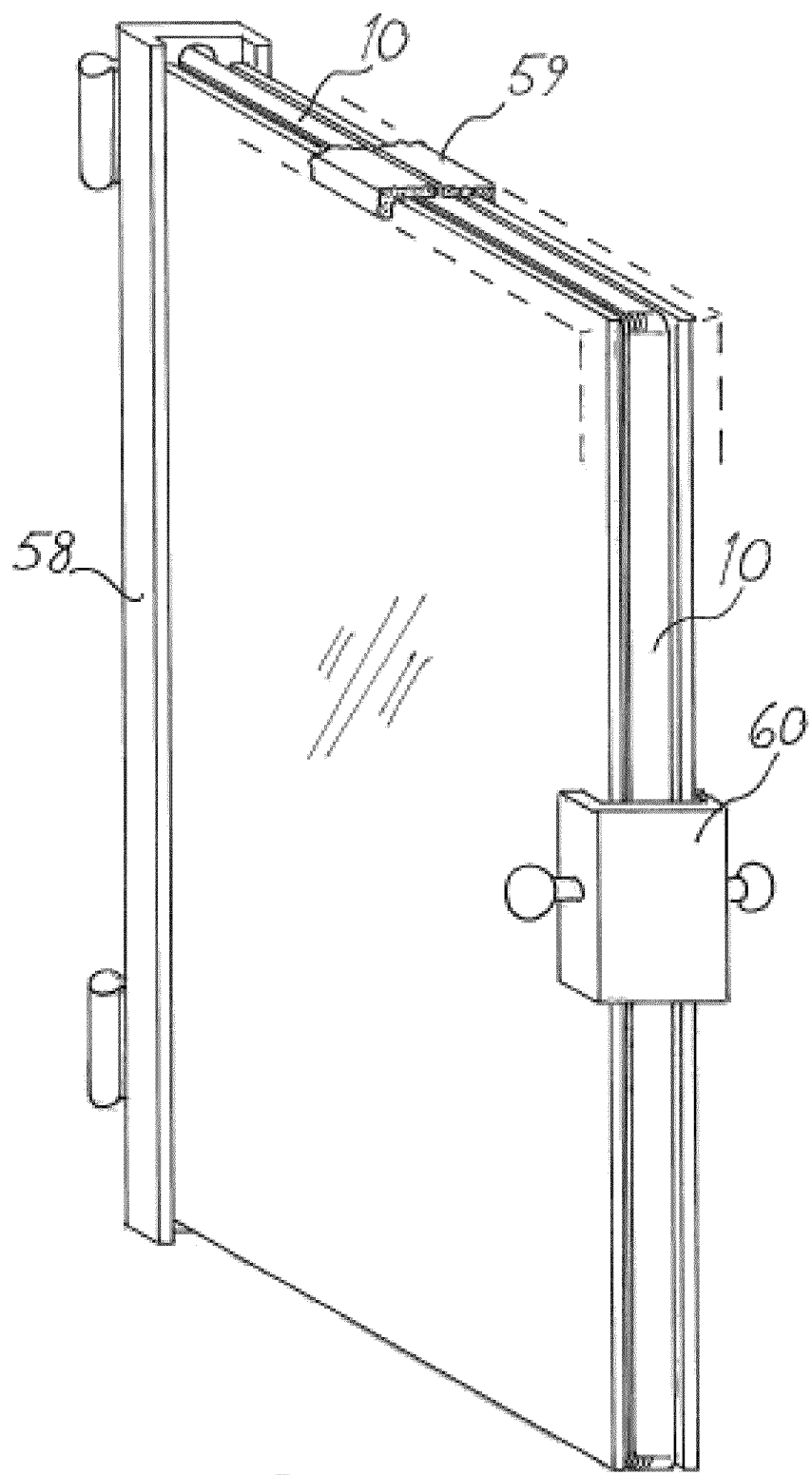
FIG. 11 shows a door with a similar arrangement to the window of FIG. 10.

FIG. 11 shows an example of a door using the glazing support system. This door is built up like the frameless window in FIG. 10, with the vertical member 58 again carrying the glazing unit 4 through the strap 10. Cover strips 59 again protect the edges of the cut glass, and may again contain sealing means. The handle assembly 60 is fixed to the glazing unit 4, typically abutting the sides of the glass as well as being fixed to the sealing spacer 50 (not shown) between the glasses by small diameter screws (not shown) or by other suitable means.

Figure 12:
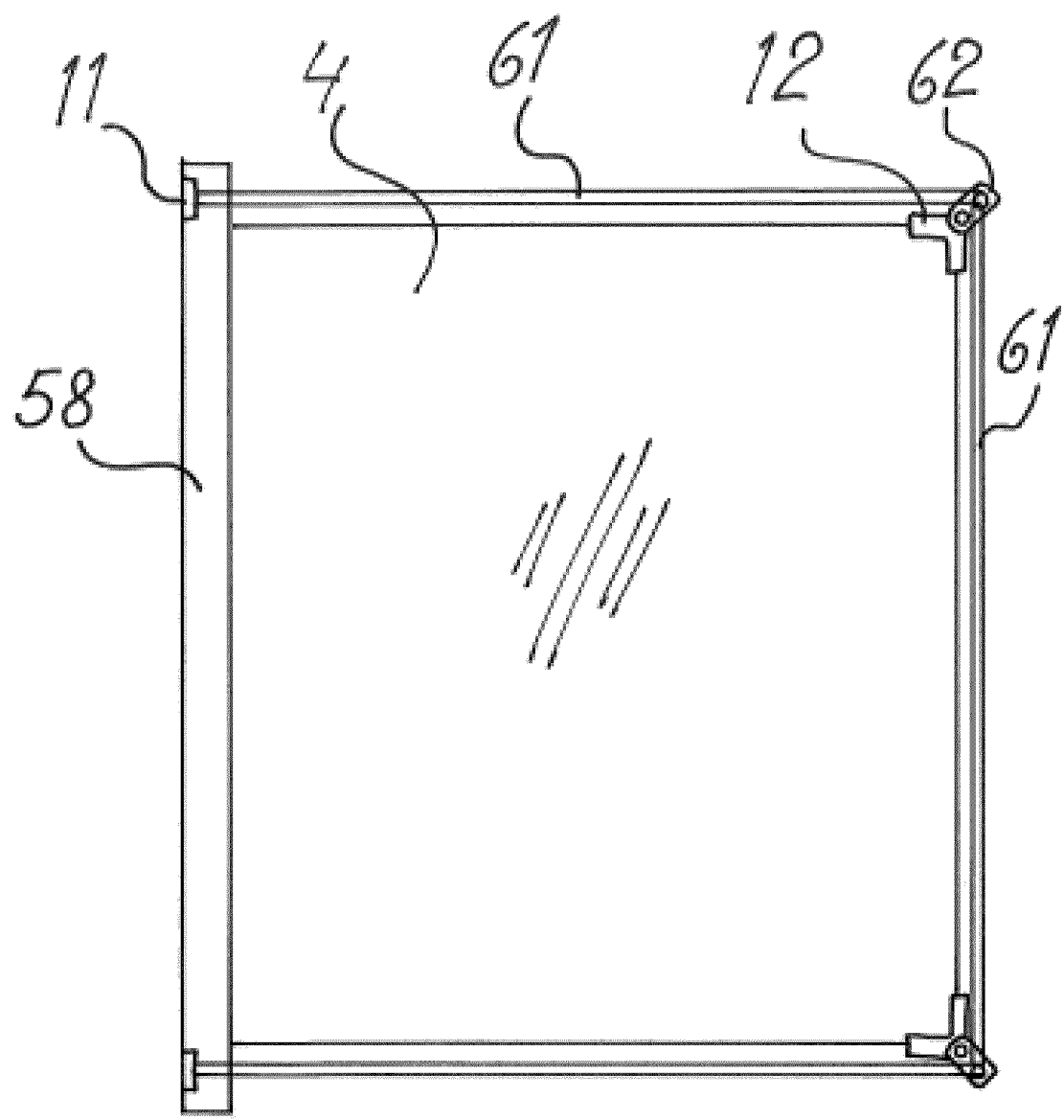
FIG. 12 illustrates a variation in which the tension member is made up of interconnected bars.

FIG. 12a) shows a variation of the glazing support unit where the tension member is provided by several links 61 that are joined together. The tension links 61, which may be rods, flat bars, channel sections or tubes, are connected to each other by the means of the pivots (pivot links, swivel) 62, which are pivotally connected to the corner blocks 12. Compared to the strap band 10 they are relatively rigid and resist bending loads, which is a reason for the use of pivoting joints. The tensioning links 61 can carry tension in a similar way to the strap band 10. They are secured to the frame member 58 through the anchors 11 as before. It is understood that the tensioning force is here transferred over the corner block in the same way as using resilient tensioning means that slides over the corner of the glazing unit 4, and the corner blocks exert compressive forces to the unit as before.

FIG. 12b) shows another variation where the tension links 61 connect to a beam 63 that supports the corner of the glazing unit 4. In this instance, in the case of the frame member being vertical, the gravity weight of the glazing unit 4 is taken up by friction between the glazing unit 4 and the frame member 58. It is understood that in this case the glazed unit may be positively fixed to the frame member by interlocking means, such as the corner block 22, as also shown in the FIG. 3e). It is further understood, that when the contact between the beam 63 and the glazing unit is at—or near—the corners of the unit, at the blocks 12, the beam 63 is subjected to only minor bending moments, thus the cross-section can be slim.

Figure 13:
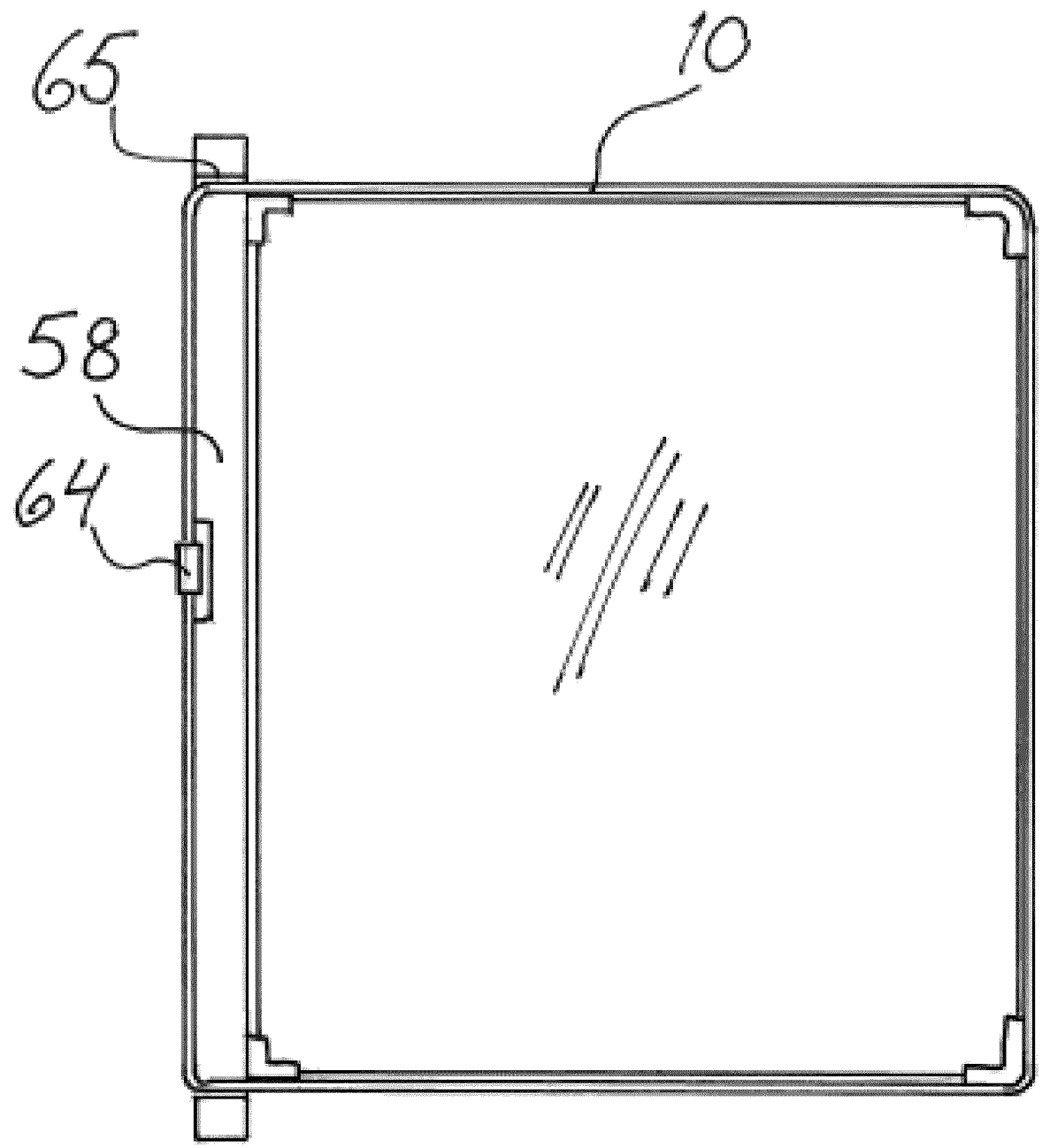
FIG. 13 shows a support system with a full circumferential strap where the ends of the strap are tensioned against each other.

FIG. 13 shows another variant which threads the tension member 10 through the main part of the frame element (in this case the vertical element 58), using holes at the top and bottom of the frame element 58. In this example the tensioning strap 10 is in a continuous loop with an "end to end" connector 64 connecting the two ends of the strap 10 to each other. This strap 10 passes through two holes in the frame element 58 and along the frame element 58 at the opposite side to the glazed unit 4, thereby securely fixing the frame element 58 and glazed unit together using the tension in the strap 10. The exits of the holes 65 at the back of the frame member 58 have rounded off edges over which the tensioning strap 10 changes direction.

Figure 14:
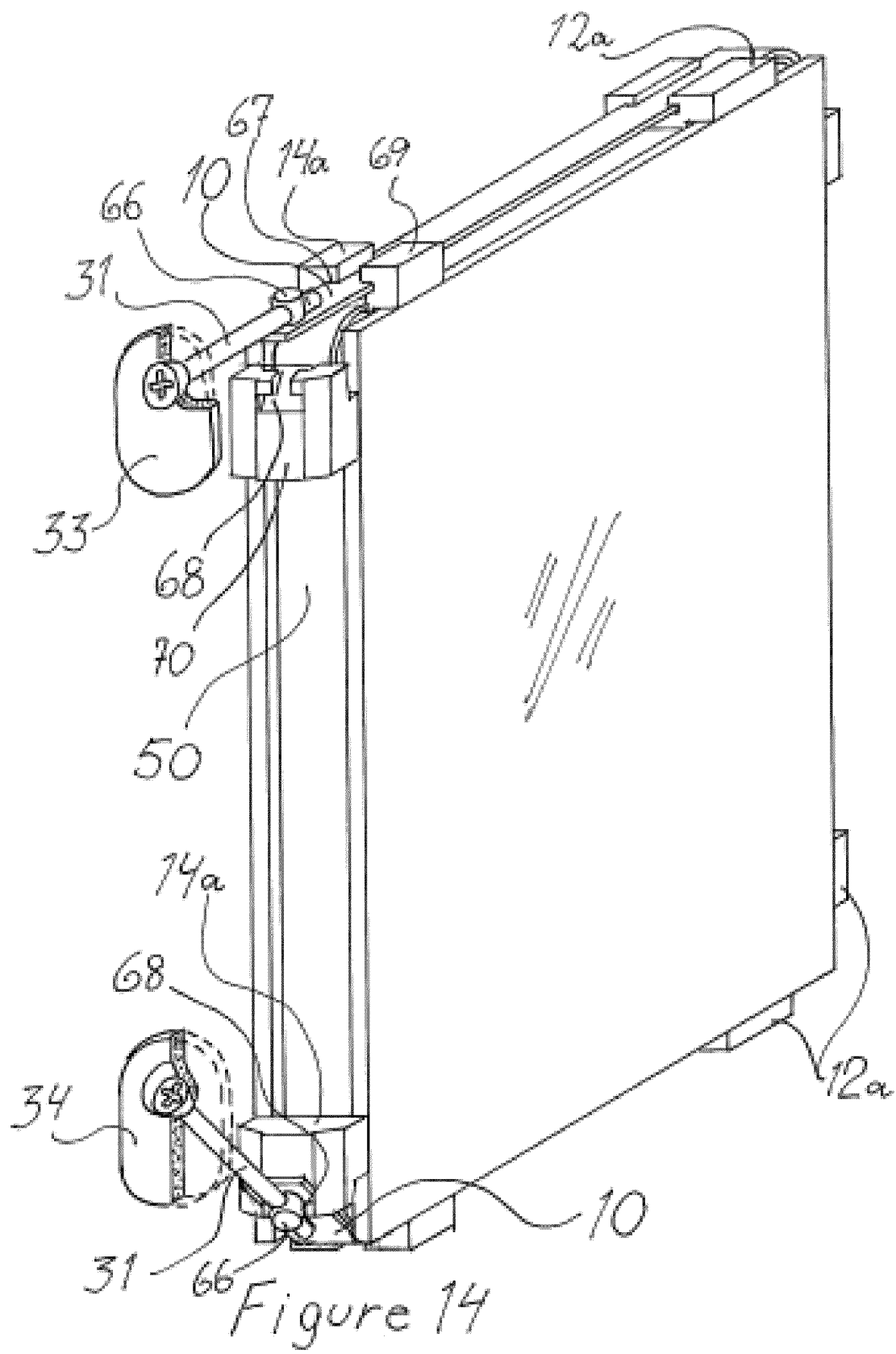
FIG. 14 shows a glazing support system similar to FIG. 2a) however with an alternative arrangement for the strapping system.

FIG. 14 shows a glazing support system similar to that of FIG. 2a, with an alternative arrangement for the strapping system. In this example the strap band 10 is anchored to the vertical frame member (not shown) by the means of screws 31, which sit in the top anchor plate 33 and the bottom anchor plate 34. The anchor plates are both abutting the vertical frame member. The screws 31 engage threaded holes in the anchor pin 66 that is fixed to either ends of the strap band 10. The top corner block 14a is abutting the vertical frame member and optionally the horizontal frame members as before (neither members are shown). The term "optionally" refers to the principle shown in FIG. 3e, where it is shown that a contact to the top horizontal frame member is not a prerequisite. The bottom corner block 14a is similar to the top corner block 14a, however arranged to be "flipped" to an opposite orientation. As before this is abutting the vertical frame member in the horizontal direction. Due to the tensioning screw 31 at the lower attachment point being at an angle then it pulls the window both sideways towards the vertical side member, as well as upwards. The recess 67 in the upper corner block 14a guides the upper end portion of the strap 10. The recess 68 in the lower corner block 14a guides the lower end portion of the strap, at the desired angle. It will be seen that the same recess 68 is present in the upper corner block 14a, but it is not used. The recesses 67, 68 have room for the protruding parts of the anchor pin 66. This means that during pre-assembly of the system the brackets 14a may be slid over the strap band 10 with the pin 66 already inserted into the strap band 10. This is beneficial as seen from the point of view of order of assembly. This feature is further beneficial as it allows the pin 66 to sit in the corner block 14a during—even after—tensioning the strap 10. This enables a compact solution.

At the other two corners, which are spaced apart from the attachment points, further corner blocks 12a are sandwiched between the strap band 10 and the glazing unit. They transfer the loads from the strap band 10 to the edge regions of the glasses of the glazing unit, as before. However, a load distribution so that the sealing spacer 50—sandwiched between the glass panels, bonded and sealed to them in the common way—also takes up a pre-determined portion of the strap contact forces to the glass unit, or the full load, is also possible. It should be understood that the pre-fabricated strap 10 with its anchor pins—together with the four corner brackets 14a, 12a—may be pre-assembled to the glazing unit before this is inserted into the window frame. It is also understood that the insertion may be straight forward without having to "fiddle" any parts, as the strapping parts do not protrude more than the recess for the glazing unit in the window frame allows. Further it is understood, that when the tensioning screws 31 are inserted from outside the frame, they will readily mate to the threaded holes in the anchor pins 66, as the strap ends are accurately positioned in the corner brackets 14a. In other words the assembly of the window can be conducted in a swift—hence cost efficient—manner.

FIG. 15a shows the combined top and bottom corner block 14a of FIG. 14. It is understood that the recess 67 effectively splits the corner block 14a structurally at the top, so that it may align to an unevenly cut and bonded glazing unit, where the glass edges do not align perfectly. Here, the contact to the top horizontal frame member may be biased to one of the two contact surfaces 69. Conversely the recess 68 may not split the corner block 14a structurally. In this case the contact surface 70 is narrowed to allow for a slight tilting of the bracket when the glass edges of the glazing unit does not line up. The connecting tongue 71 has a small resistance to torsion, and enables the connected bodies of the corner block 14a to align individually to the edges of the glazing unit.

FIG. 15b shows the corner block 12a. It is noted that during assembly to the strap band 10, it may be "snapped" over the band 10—thus avoiding having to slide it along the band 10 from the end of the band 10.

The corner blocks 12a, 14a may be moulded as a flat part, to be bent together with the strap band 10 around the corner of the glazing unit during assembly. The corner blocks 12a, 14a may typically be moulded in a polymer material, enabling both fabrication by injection moulding as well as twisting of the tongue portion 71, as already elaborated. It is noted that both the corner brackets 12a and 14a provide contacts to the cut edges of the glass in the corner regions, however at some distance away from the corner edge itself. This is structurally beneficial, as the load carrying capacity of the glass increases somewhat away from the corners.

FIG. 15c shows, in an exploded view, further details and components related to the anchoring of the ends of the strap band 10. It is noted that the same principle may apply to both ends of the strap. A hole 72 is provided at the end of the strap band 10. The hole 72 may be partially-circular, with one or two straight sides 75, and may be produced by punching, employing a mandrel and a die. It may also be produced by water- or laser cutting. The anchor pin 66 has a pin profile matching the shape of the hole 72, with flat(s) 75, so that once pressed in, it is rotationally orientated. This is necessary for the screw 31 to align to the threaded hole in the anchor pin 66. The head 73 on the anchor pin 66 secures the pin against being pulled through the hole 72 in the strap band 10.

FIG. 15d gives an enlarged side view of the system in the assembled state. The undercut 74 secures the anchor pin 66 against falling out of the strap band 10, before the screw 31 engages the threaded hole in the pin 66. It is understood that when the hole 72 in the strap band 10 is slightly smaller than the section of the pin 66, the band 10 will snap into the recess 74 at the end of the press-in operation. It is realized that once the screw 31 has engaged the pin 66, the connection is secure. For a failure (disconnection) to occur then as the pin 66 would have to be sheared off, or the strap band 10 sheared through, or the threads or the bolt to fail, for the connection to fail. It can be shown, that even with components with handy dimensions, a high margin of safety can be achieved for securing common glazing units.

FIG. 15e shows a means and method of mating the tensioning screw 31 to the strap band 10, using the material resources of the band 10 directly. This could be used as an alternative to the use of the anchor pin 66. In the example of FIG. 15e a succession of partially-circular wall portions 76 are formed by combined punching and forming (indenting) in opposite directions. A "free hole" 77 is fabricated using press tools as means as well. Threads are cut or formed on the inside of the formed wall portions, allowing for the tensioning screw 31 to engage with the strap 10. The formed portions may alternatively be made without threads, if the screw 31 is of the self-tapping type and/or with a suitable combination of screw material and strap material. It is understood that this gives a secure connection, as the formed portions will tend to "narrow to the screw" when the screw 31 is tensioning the strap 10.

The proposed glazing support unit is beneficial for windows with glazing units 4 formed with two or more layers, as commonly used. It will enable slim frames for windows with small glass areas, although it will be understood that the effect is magnified with bigger glass areas. This means that the positive impact from the reduced thickness of the window frame is greater in comparison to the current necessary cross section dimensions for the corresponding window frame, with the already mentioned benefits due to this. Some examples include the use of 4 mm double or triple glass, spaced apart 6, 9, 12 or 15 mm, up to a glass area of 3.3 $m^2$, extending up to 2.5 m sideways. Other examples involve 5 mm double or triple glass, spaced apart 6, 9, 12 or 15 mm, for glass areas up to 5 $m^2$, extending up to 3.3 m sideways. Further examples might use 6 mm double or triple glass, again spaced apart by 6, 9, 12 or 15 mm, for glass areas up to 7 $m^2$, extending up to 4 m sideways.

Multiple straps 10 may be used in parallel, particularly when the glazing unit 4 has three or more layers of glass and hence an increased width. It is also understood that straps 10 may be sandwiched to each other to increase the load capacity. The strap(s) 10 and their anchoring systems can be dimensioned according to the load they are carrying, as defined by the weight of the glass, the relative height- and width dimensions, and whether the glazing unit 4 is hung from a vertical or horizontal frame member.

Further the fire resistance of the window, when it is acting as a barrier against a fire, is improved, when flammable window frames in wood or polymer (plastic) materials, are reduced in size and the size of the non-flammable glass is increased, compared to hitherto.

As well as the use of a strap band 10 or links 61 the glazing support system may also incorporate other forms of tension member, such as strings, ropes, belts, wires, chains, pull rods together with corner brackets and other tensioning means working in a similar manner.

It is understood that this assembly provides a structurally efficient and low cost solution for a window frame, at the same time as a very slim frame, with the benefits mentioned earlier thereby, is also enabled.

The invention claimed is:

1. A glazing assembly comprising: a glazing support system, a glazing unit and a frame element, wherein the glazing support system is configured for attaching the glazing unit to the frame element, the glazing support system comprising: a tension member for extending around at least 75% of a periphery of the glazing unit, wherein the tension member is arranged to bear on one or more corners of the glazing unit and to thereby apply a compression force to the glazing unit; a connection system for coupling the tension member to the frame element in at least two locations and for transferring tension forces from the tension member to the frame element whilst compression forces arising due to tension in the tension member are applied to an outside of the glazing unit; and one or more corner block(s) for placement on respective corners of the one or more corners of the glazing unit to aid in effective transfer of compression forces from the tension member to the respective corners, wherein each corner block of the one or more corner block(s) is configured to fit around its respective corner of the glazing unit and contact the glazing unit on two sides of the glazing unit adjacent to its respective corner.

2. A glazing assembly as claimed in claim 1, wherein the frame element holds more than half of tension loads from the tension member.

3. A glazing assembly as claimed in claim 1, wherein the frame element is located along only side of the glazing unit.

4. A glazing assembly as claimed in claim 1, wherein the tension member is a strap in the form of band of material.

5. A glazing assembly as claimed in claim 1, wherein the material of the tension member has a coefficient of thermal expansion similar to that of glass so that during temperature changes there is no significant increase or decrease in the forces from the interaction of the glazing unit and the tension member.

6. A glazing assembly as claimed in claim 1, wherein the tension member is steel.

7. A glazing assembly as claimed in claim 1, comprising a tensioning mechanism at one or both ends of the tension member.

8. A glazing assembly as claimed in claim 1, wherein at least one tensioning mechanism is arranged to be attached to the frame element.

9. A glazing assembly as claimed in claim 1, wherein a tensioning mechanism is provided part-way along the length of the tension member.

10. A glazing assembly as claimed in claim 1, wherein the frame element includes hinges allowing for the glazing unit to be moved between open and closed positions, and the hinges are joined to connectors and/or tensioning mechanisms for coupling to the tension member.

11. A glazing assembly as claimed in claim 1, wherein the connection system includes one or more connector(s) for attachment to the tension member, and the one or more connector(s) includes an anchor block arranged to hold an end of the tension member to the frame element, and includes two anchor blocks each arranged at a respective end of the tension member.

12. A glazing assembly as claimed in claim 11, including: a first tensioning mechanism as a part of a first anchor block at a first end of the frame element, the first tensioning mechanism arranged to be adjacent a first corner at one end of a first side of a four-sided glazing unit, with the frame element placed along the first side of the glazing unit; and a second tensioning mechanism as a part of a second anchor block at a second end of the frame element with the second tensioning mechanism arranged to be adjacent a second corner at the other end of the first side of the glazing unit;

wherein the tension member extends from the first corner, away from the frame element and the first side of the glazing unit, around three other sides of the glazing unit and around third and fourth corners thereof before returning to the second end of the frame element at the second corner of the glazing unit.

13. A glazing assembly as claimed in claim 1, wherein the one or more corner block(s) are arranged to deform in order to distribute forces evenly between the tension member and the glazing unit.

14. A glazing assembly as claimed in claim 1, wherein each of the one or more corner block(s) includes: a load bearing section for placement across a width of the glazing unit around a corner thereof and in between the glazing unit and the tension member; and flanges forming sidewalls extending from outer parts of the load bearing section toward and/or away from the glazing unit.

15. A glazing assembly as claimed in claim 14, wherein each of the one or more corner block(s) include inner flanges extending toward the glazing unit to form sidewalls of an inside channel of the corner block for ensuring that the corner block is securely seated on the glazing unit.

16. A glazing assembly as claimed in claim 15, wherein the inner flanges are not present at a vertex of the corner block.

17. A glazing assembly as claimed in claim 14, wherein the one or more corner block(s) include outer flanges extending away from the glazing unit to form sidewalls of an outside channel for ensuring that the tension member is securely seated on the or each corner block.

18. A glazing assembly as claimed in claim 1, wherein the connection system includes one or more connector(s), and the one or more connector(s) include one or more bridge connector(s) for holding the tension member at one or more points along the length of the tension member and for transferring tension forces to the frame element at points away from the ends of the tension member, wherein each bridge connector of the one or more bridge connector(s) takes the form of an opening on the frame element, such as a loop provided on the frame element, with the tension member threaded through the opening of each bridge connector.

19. A glazing assembly as claimed in claim 18, wherein the frame element includes a bracket configured for placement at a corner of the glazing unit, the bracket including bridge connectors adjacent the sides of the glazing unit spaced apart from the corner, wherein the tension member is arranged to extend along one side of the glazing unit via a first bridge connector of the bracket; then around the corner of the glazing unit, applying a compression force to the corner; then through a second bridge connector of the bracket and toward a further corner of the glazing unit.

20. A glazing assembly as claimed in claim 19, including multiple brackets with one bracket for placement at each corner of the glazing unit, wherein hinges are incorporated with brackets at two adjacent corners, and wherein the brackets also hold anchor blocks and/or tensioning mechanisms.

21. A glazing assembly as claimed in claim 1, wherein the glazing assembly is a door, a window, or a glazed building panel.

22. A kit for attaching a glazing unit to a frame element to form the glazing assembly as claimed in claim 1, the kit comprising at least the tension member and the connection system.

23. A method for supporting a glazing unit using a glazing support system in a glazing assembly as claimed in claim 1, the method comprising: locating the glazing unit and frame element adjacent one another; placing the tension member around the at least a part of the periphery of the glazing unit; and attaching the connection system to the tension member for transferring tension forces from the tension member to the frame element.

24. A glazing assembly comprising: a glazing support system, a glazing unit and a frame element, wherein the glazing support system is configured for attaching the glazing unit to the frame element, the glazing support system comprising: a tension member for extending around at least 75% of a periphery of the glazing unit, wherein the tension member is arranged to bear on one or more corners of the glazing unit and to thereby apply a compression force to the glazing unit; a connection system for coupling the tension member to the frame element in at least two locations and for transferring tension forces from the tension member to the frame element whilst compression forces arising due to tension in the tension member are applied to an outside of the glazing unit; and one or more corner block(s) for placement on respective corners of the one or more corners of the glazing unit to aid in effective transfer of compression forces from the tension member to the respective corners, wherein each of the one or more corner block(s) includes:
    a load bearing section for placement across a width of the glazing unit around a corner thereof and in between the glazing unit and the tension member;
    flanges forming sidewalls extending from outer parts of the load bearing section toward and/or away from the glazing unit; and
    inner flanges extending toward the glazing unit to form sidewalls of an inside channel of the corner block for ensuring that the corner block is securely seated on the glazing unit, wherein the inner flanges are not present at a vertex of the corner block.

25. A glazing assembly comprising: a glazing support system, a glazing unit and a frame element, wherein the glazing support system is configured for attaching the glazing unit to the frame element, the glazing support system comprising: a tension member for extending around at least 75% of a periphery of the glazing unit; a connection system for coupling the tension member to the frame element in at least two locations and for transferring tension forces from the tension member to the frame element whilst compression forces arising due to tension in the tension member are applied to an outside of the glazing unit, wherein the connection system includes two anchor blocks for attachment to the tension member, each arranged to hold a respective end of the tension member to the frame element;
    a first tensioning mechanism as a part of a first anchor block at a first end of the frame element, the first tensioning mechanism arranged to be adjacent a first corner at one end of a first side of a four-sided glazing unit, with the frame element placed along the first side of the glazing unit; and
    a second tensioning mechanism as a part of a second anchor block at a second end of the frame element with the second tensioning mechanism arranged to be adjacent a second corner at the other end of the first side of the glazing unit;
    wherein the tension member extends from the first corner, away from the frame element and the first side of the glazing unit, around three other sides of the glazing unit and around third and fourth corners thereof before returning to the second end of the frame element at the second corner of the glazing unit.

26. A glazing assembly comprising: a glazing support system, a glazing unit and a frame element, wherein the glazing support system is configured for attaching the glazing unit to the frame element, the glazing support system comprising: a tension member for extending around at least 75% of a periphery of the glazing unit; and a connection system for coupling the tension member to the frame element in at least two locations and for transferring tension forces from the tension member to the frame element whilst compression forces arising due to tension in the tension member are applied to an outside of the glazing unit; wherein the connection system includes bridge connectors for holding the tension member at points along the length of the tension member and for transferring tension forces to the frame element at points away from the ends of the tension member, wherein the bridge connectors take the form of openings on the frame element, such as loops provided on the frame element, with the tension member threaded through the openings; and wherein the frame element includes a bracket configured for placement at a corner of the glazing unit, the bracket including bridge connectors adjacent sides of the glazing unit spaced apart from the corner, wherein the tension member is arranged to extend along one side of the glazing unit via a first bridge connector of the bracket; then around the corner of the glazing unit, applying a compression force to the corner; then through a second bridge connector of the bracket and toward a further corner of the glazing unit.

27. A glazing assembly as claimed in claim 26, including multiple brackets with one bracket for placement at each corner of the glazing unit, wherein hinges are incorporated with brackets at two adjacent corners, and wherein the brackets also hold anchor blocks and/or tensioning mechanisms.

* * * * *